(12) United States Patent
Huang et al.

(10) Patent No.: US 10,764,721 B1
(45) Date of Patent: Sep. 1, 2020

(54) SYSTEMS AND METHODS FOR UE LOCATION AND MOBILITY

(71) Applicant: Verizon Patent and Licensing Inc., Arlington, VA (US)

(72) Inventors: Ye Huang, San Ramon, CA (US); Miguel A. Carames, Long Valley, NJ (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/799,524

(22) Filed: Feb. 24, 2020

(51) Int. Cl.
*H04W 4/029* (2018.01)
*H04W 36/00* (2009.01)
*H04W 76/12* (2018.01)

(52) U.S. Cl.
CPC ....... *H04W 4/029* (2018.02); *H04W 36/0055* (2013.01); *H04W 76/12* (2018.02)

(58) Field of Classification Search
CPC ....... H04W 4/02; H04W 4/029; H04W 76/12; H04W 36/0055; H04W 36/32
See application file for complete search history.

(56) References Cited

U.S. PATENT DOCUMENTS 10,477,390 B1 * 11/2019 Verma ............. H04W 12/00503
2017/0034749 A1 * 2/2017 Chandramouli .. H04W 36/0055
2017/0332192 A1 * 11/2017 Edge ...................... G01S 5/0036
2018/0343635 A1 * 11/2018 Edge ...................... H04W 88/18
2019/0313209 A1 * 10/2019 Edge ...................... H04W 4/029
2019/0313416 A1 * 10/2019 Opshaug ................. H04W 4/02

OTHER PUBLICATIONS

3GPP TR 21.905 V16.0.0 (Jun. 2019), "3rd Generation Partnership Project; Technical Specification Group Services and System Aspects; Vocabulary for 3GPP Specifications (Release 16)," Jun. 2019.
3GPP TS 38.413 V16.0.0 (Dec. 2019), "3rd Generation Partnership Project; Technical Specification Group Radio Access Network; NG-RAN; NG Application Protocol (NGAP) (Release 16)," Dec. 2019.
P. Sahu, "5G PDU Session Establishment," Oct. 2018 (available at http://5gblogs.com/59-pdu-session-establishment/, accessed Feb. 24, 2020).

(Continued)

*Primary Examiner* — Dinh Nguyen

(57) ABSTRACT

Systems described herein provide techniques for establishing and modifying user plane communications sessions between Long-Term Evolution ("LTE") User Equipment ("UE") devices, connected to LTE base stations, and a Fifth Generation ("5G") core network. An LTE-5G Interworking function ("LTE-5G IWF") may logically generate a virtual 5G UE and/or 5G base station, map a LTE UE to the virtual 5G UE, and cause the establishment of a Protocol Data Unit ("PDU") Session, at the 5G core network, with the virtual 5G UE. The LTE-5G IWF may also maintain a 5G context, including the information of the virtual 5G UE and/or 5G base station, based on the actual location of the LTE UE and/or an LTE base station to which the LTE UE is connected. The LTE-5G IWF may further update this context, including location information, when the LTE UE is handed over from one LTE base station to another.

20 Claims, 13 Drawing Sheets

(56) References Cited

OTHER PUBLICATIONS

"gNB Interactions: 5G Standalone Access Registration," Feb. 2019 (available at https://www.eventhelix.com/5G/standalone-access-registration/gNB.pdf), accessed Feb. 24, 2020).
"LTE Attach and Default Bearer Setup," Mar. 2019 (available at https://www.eventhelix.com/lte/attachilte-attach.pdf, accessed Feb. 24, 2020).
"UE Interactions: 5G Standalone Access Registration," Feb. 2019 (available at https://www.eventhelix.com/5G/standalone-access-registration/UE.pdf, accessed Feb. 24, 2020).
ETSI TS 123 501 V15.3.0 (Sep. 2018), "5G; System Architecture for the 5G System (3GPP TS 23.501 version 15.3.0 Release 15)," Sep. 2018.
ETSI TS 123 502 V15.2.0 (Jun. 2018), "5G; Procedures for the 5G System (3GPP TS 23.502 version 15.2.0 Release 15)," Jun. 2018.
"S1AP View of Inter MME S1 Handover in LTE" (available at https://www.eventhelix.com/lte/handover/s1/lte-inter-mme-s1-handover-s1ap-view.pdf, accessed Feb. 24, 2020).

\* cited by examiner

SYSTEMS AND METHODS FOR UE LOCATION AND MOBILITY

BACKGROUND

Wireless networks utilize different types of radio access networks ("RANs") and/or core networks. Fifth Generation ("5G") RANs may offer relatively low latency and/or high throughput services, but may not be as widely deployed as Long-Term Evolution ("LTE") RANs, which may be available or already installed in areas that do not have 5G coverage.

DETAILED DESCRIPTION OF THE PREFERRED EMBODIMENTS

The following detailed description refers to the accompanying drawings. The same reference numbers in different drawings may identify the same or similar elements.

Embodiments described herein provide for the establishment and modification of connections (e.g., user plane sessions) between User Equipment ("UE") communicating via a LTE radio access technology ("RAT") and a 5G core network. As discussed herein, a LTE-to-5G Interworking Function ("LTE-5G IWF") may be communicatively coupled to one or more devices or systems associated with an LTE network (e.g., one or more LTE base stations, which may take the form of evolved Node Bs ("eNBs") and/or one or more Mobility Management Entities ("MMEs")) and to one or more devices or systems associated with a 5G network (e.g., an Access and Mobility Function ("AMF")).

As described herein, the LTE-5G IWF may receive information regarding a LTE UE that has connected to a particular eNB (e.g., using an LTE RAT), and may simulate control plane signaling associated with establishing communications between the UE and an LTE core network. Further, the LTE-5G IWF may simulate, based on the eNB and the LTE UE, a 5G base station (e.g., a Next Generation Node B ("gNB")) and a 5G UE. As discussed herein, the simulated gNB and 5G UE may be referred to as a "virtual" gNB and a "virtual" 5G UE, or as a "vgNB" and a "vUE," respectively. The LTE-5G IWF may communicate control signaling with an AMF of a 5G core network to simulate the establishment of communications between the 5G core network and the vUE (e.g., as if the vUE were connected to the vgNB). By virtue of performing these control signaling processes with elements of the LTE network and the 5G network, each of these networks may maintain a context associated with a UE. That is, the LTE network may maintain context information associated with the LTE UE, and the 5G network may maintain context information associated with the vUE. As described herein, these "dual" contexts (i.e., as maintained by the LTE and 5G networks, respectively) may further be used to establish and/or modify one or more user plane data sessions between the LTE UE and a User Plane Function ("UPF") of the 5G network.

Figure 1:
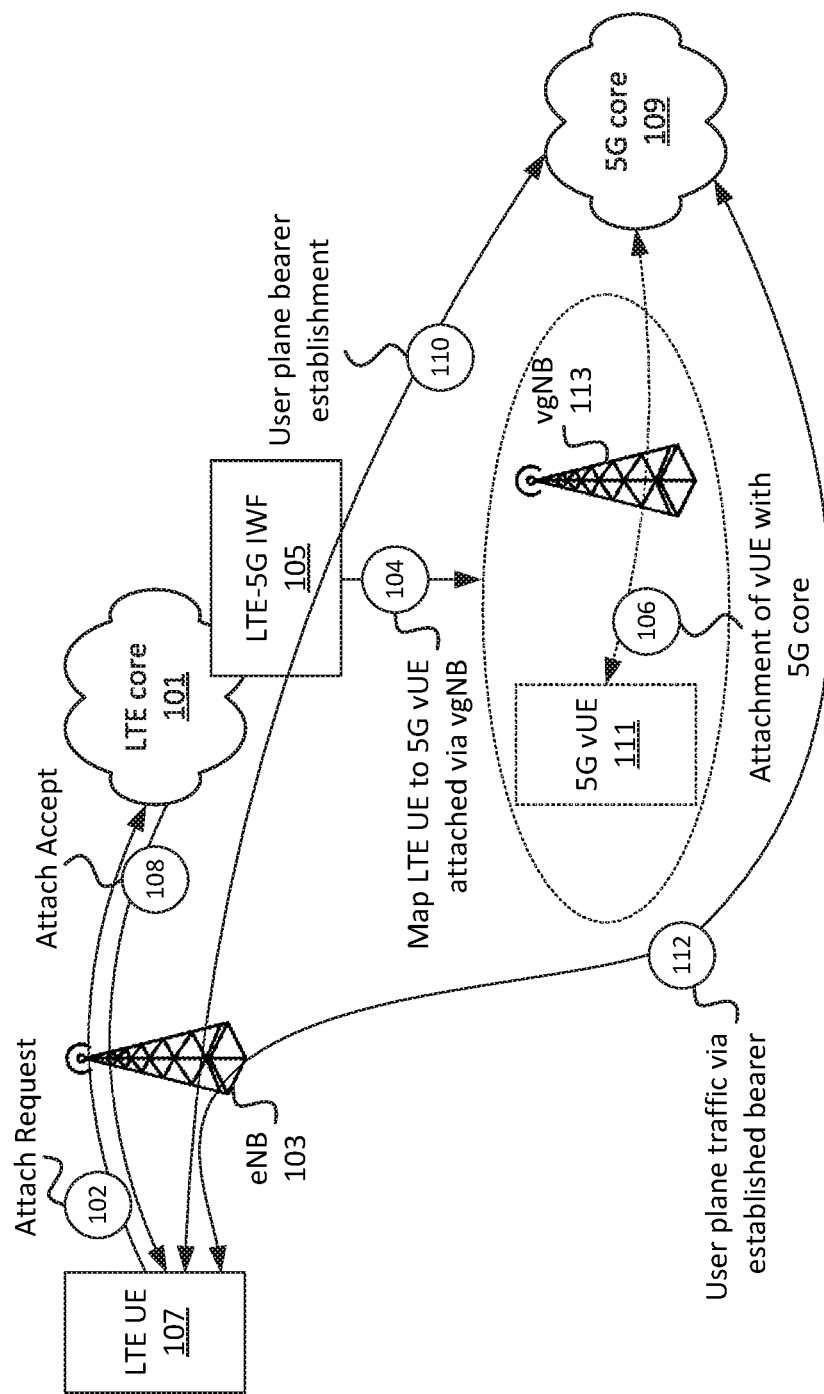
FIG. 1 illustrates an example overview of one or more embodiments described herein, in which a Long-Term Evolution ("LTE")-to-Fifth Generation ("5G") Interworking Function ("LTE-5G IWF") may operate to establish communications between a LTE User Equipment ("UE") and a 5G core network.

FIG. 1 provides an overview of some of the concepts discussed above. As shown in FIG. 1, for example, LTE core network 101 may receive (at 102) an Attach Request. For the sake of simplicity, the Attach Request is shown in this figure as originating from LTE UE 107. In practice, the Attach Request may be received from eNB 103, which may output the Attach Request based on a Radio Resource Configuration ("RRC") connection procedure performed between UE 101 and eNB 103. That is, once a radio frequency ("RF") connection has been established between UE 101 and eNB 103, eNB 103 may output the Attach Request, associated with UE 101, to one or more elements of LTE core network 101. The Attach Request may be sent via an S1-C interface between eNB 103 and an MME of LTE core network 101.

As shown in FIG. 1, LTE core network 101 may include, and/or may be communicatively coupled to, LTE-5G IWF 105. For example, LTE-5G IWF 105 may be communicatively coupled with an MME of LTE core network 101 (e.g., a particular MME that received the Attach Request from eNB 103), and may receive the Attach Request from the MME. Additionally, or alternatively, a first MME of LTE core network 101 may receive the Attach Request, determine that LTE UE 107 and/or the Attach Request should be forwarded to a second MME and/or to LTE-5G IWF 105, and may accordingly forward the Attach Request to the second MME and/or to LTE-5G IWF 105.

The Attach Request may include information identifying LTE UE 107. Generally, the identifying information received in the Attach Request may include identifying information used by LTE networks to establish communications between LTE UEs and LTE RANs and/or a LTE core network. The identifying information received in the Attach Request may include, in some embodiments, International Mobile Subscriber Identity ("IMSI"), International Mobile Station Equipment Identity ("IMEI"), Globally Unique Temporary Identifier ("GUTI"), and/or identifying information of LTE UE 107. In some embodiments, the Attach Request may include one or more Packet Data Network ("PDN") identifiers, which may indicate a type of service or application that LTE UE 107 is requesting (e.g., voice, data, etc.). In some embodiments, the Attach Request may include information based on which LTE-5G IWF 105 may determine a location of LTE UE 107, and/or of eNB 103. For example, the Attach Request may include an identifier of eNB 103 (based on which the location may be looked up from a repository that maintains information regarding locations of eNBs), may include coordinates of LTE UE 107 and/or eNB 103, and/or may include one or more other location identifiers of LTE UE 107 and/or of eNB 103.

Once LTE-5G IWF 105 receives the Attach Request, LTE-5G IWF 105 may generate a 5G context, for subsequent use by 5G core network 109, associated with LTE UE 107. For example, LTE-5G IWF 105 may map a first set of identifiers associated with LTE UE 107 (e.g., IMSI, IMEI, GUTI, PDN identifier, and/or one or more other identifiers) to a second set of identifiers. As discussed above, this first set of identifiers may have been received via the Attach Request, and may be associated with operations related to LTE networks. The second set of identifiers may be generated by LTE-5G IWF 105 and/or selected from a pool of available identifiers, and may be associated with operations related to 5G networks. The second set of identifiers may include, for example, a Subscription Concealed Identifier ("SUCI"), a Subscription Permanent Identifier ("SUPI"), a Permanent Equipment Identifier ("PEI"), Access Point Name ("APN"), and/or another identifier. In some embodiments, the second set of identifiers may include one or more cell or base stations identifiers associated with 5G networks, such as a New Radio ("NR") Cell Identity ("NCI"), NR Cell Global Identity ("NCGI"), and/or some other identifier associated with base stations (e.g., gNBs) associated with a 5G RAN. As described herein, the second set of identifiers may include an identifier of a vgNB that is selected or generated based on the location of LTE UE 107 and/or eNB 103, as indicated in the Attach Request (at 102).

In some embodiments, the second set of identifiers may be generated based on the first set of identifiers. For example, LTE-5G IWF 105 may generate one or more of the second set of identifiers by performing a hash or some other function based on one or more of the first set of identifiers. In some embodiments, the second set of identifiers may be generated or selected independent of the values of the first set of identifiers.

As mentioned above, the mapped identifiers (e.g., the second set of identifiers) may be associated with a "virtual" UE and gNB, conceptually shown in FIG. 1 as 5G vUE 111 and vgNB 113, and may be used to simulate the attachment of 5G vUE 111 to 5G core network 109 via vgNB 113. LTE-5G IWF 105 may thus maintain a "dual context" associated with LTE UE 107. A first context may include information (such as the first set of identifiers) used to establish, maintain, modify, etc. communications between LTE UE 107 and LTE core network 101, and the second context may include information (such as the second set of identifiers) used to establish, maintain, modify, etc. communications between 5G vUE 111 and 5G core network 109. As described herein, these dual contexts may be used by LTE-5G IWF 105 to facilitate communications between LTE UE 107 and 5G core network 109.

For example, LTE-5G IWF 105 may use one of these contexts (e.g., including the second set of identifiers) to simulate (at 106) the attachment of 5G vUE 111 to 5G core network 109. The attachment procedure may be performed, for example, by way of communications between LTE-5G IWF 105 and an AMF of LTE-5G IWF 105. Thus, while conceptualized in the figure as being "performed by" 5G vUE 111 through vgNB 113, the actual signaling to simulate the attachment of 5G vUE 111 to 5G core network 109 may be performed by LTE-5G IWF 105.

Figure 2A:
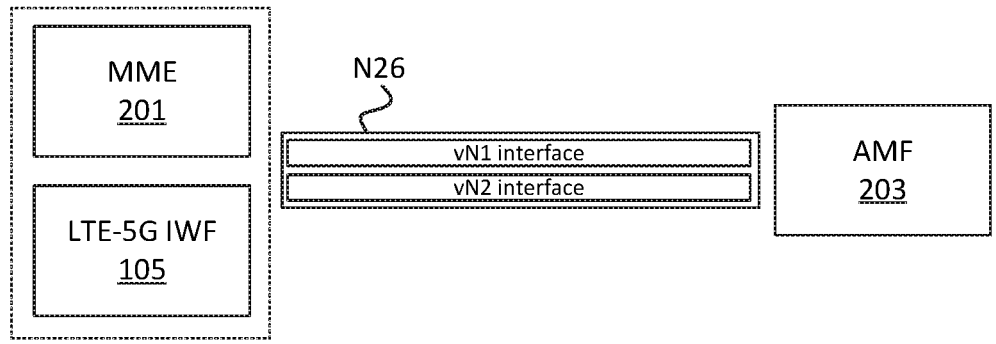
FIGS. 2A and 2B conceptually illustrate virtual 5G interfaces, which may be provided by the LTE-5G IWF of some embodiments.

For instance, as shown in FIG. 2A, LTE-5G IWF 105 and/or MME 201 (which may be associated with LTE core network 101) may communicate with AMF 203 (which may be associated with 5G core network 109) via an N26 interface. In some embodiments, LTE-5G IWF 105 may communicate with AMF 203 "directly" via the N26 interface. In some embodiments, LTE-5G IWF 105 may "indirectly" communicate with AMF 203 via the N26 interface by communicating with MME 201, which may in turn communicate with AMF 203 via the N26 interface. Similarly, AMF 203 may communicate with LTE-5G IWF 105 "directly" via the N26 interface, and/or "indirectly" by communicating messages, intended for LTE-5G IWF 105, to MIME 201. For brevity, communications will be described herein as though LTE-5G IWF 105 and AMF 203 are "directly" connected via the N26 interface. In practice, such communications may be provided "indirectly" in a manner similar to that outlined above.

Via the interface between LTE-5G IWF 105 and AMF 203, "virtual" N1 and N2 interfaces (shown in the figure as "vN1" and "vN2") may be provided. For example, LTE-5G IWF 105 and AMF 203 may communicate, via N26 messages (e.g., in N26 "containers"), N1 and/or N2 messages (e.g., messages in N1 and/or N2 containers). That is, a "vN1" message may be passed by LTE-5G IWF 105 to AMF 203 (or vice versa) by providing the message in an N1 container that is contained within an N26 container. Similarly, a "vN2" message may be passed by LTE-5G IWF 105 to AMF 203 (or vice versa) by providing the message in an N2 container that is contained within an N26 container.

Figure 2B:
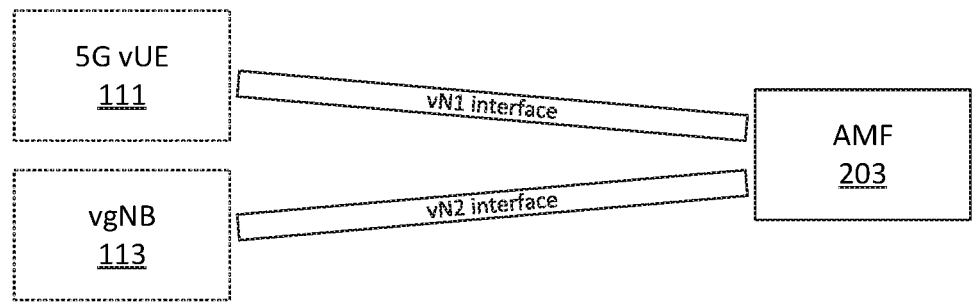

As shown in FIG. 2B, for example, the vN1 interface may be used to simulate messages between vUE 111 and AMF 203, and the vN2 interface may be used to simulate messages between vgNB 113 and AMF 203. Thus, a message sent by LTE-5G IWF 105 via the vN1 interface (e.g., in an N1 container) may be interpreted by AMF 203 as having been sent by vUE 111, while a message sent by LTE-5G IWF 105 via the vN2 interface (e.g., in an N2 container) may be interpreted by AMF 203 as having been sent by gNB 113.

Returning to FIG. 1, once the attachment of 5G vUE 111 to 5G core network 109 has been simulated, LTE-5G IWF 105 may perform (at 110) a user plane bearer establishment procedure. Briefly, this procedure may include establishing one or more bearers, sessions, tunnels (e.g., a General Packet Radio Service ("GPRS") Tunneling Protocol ("GTP") tunnel), etc. between eNB 103 and one or more devices or systems (e.g., a UPF) associated with 5G core network 109. Once established, eNB 103 and 5G core network 109 (e.g., the UPF of 5G core network 109) may be configured to communicate (at 112) user plane traffic, such as voice traffic, data traffic, etc., with each other. Further, by virtue of its attachment to eNB 103, LTE UE 107 may now be considered to be communicatively coupled to 5G core network 109, and may communicate with 5G core network 109 without using any different signaling than when LTE UE 107 is communicatively coupled to LTE core network 101.

Furthermore, as described herein, elements of the 5G core may be able to utilize or provide location-based services for LTE UE 107 and/or for application servers that request the location of LTE UE 107. For example, as discussed below, the location of LTE UE 107 may be provided to a Network Exposure Function ("NEF"), which may provide the location of LTE UE 107 to an external Application Server ("AS"). The AS may utilize the location information for location-based services, such as map services, location-aware content delivery services, or the like.

Figure 3A:
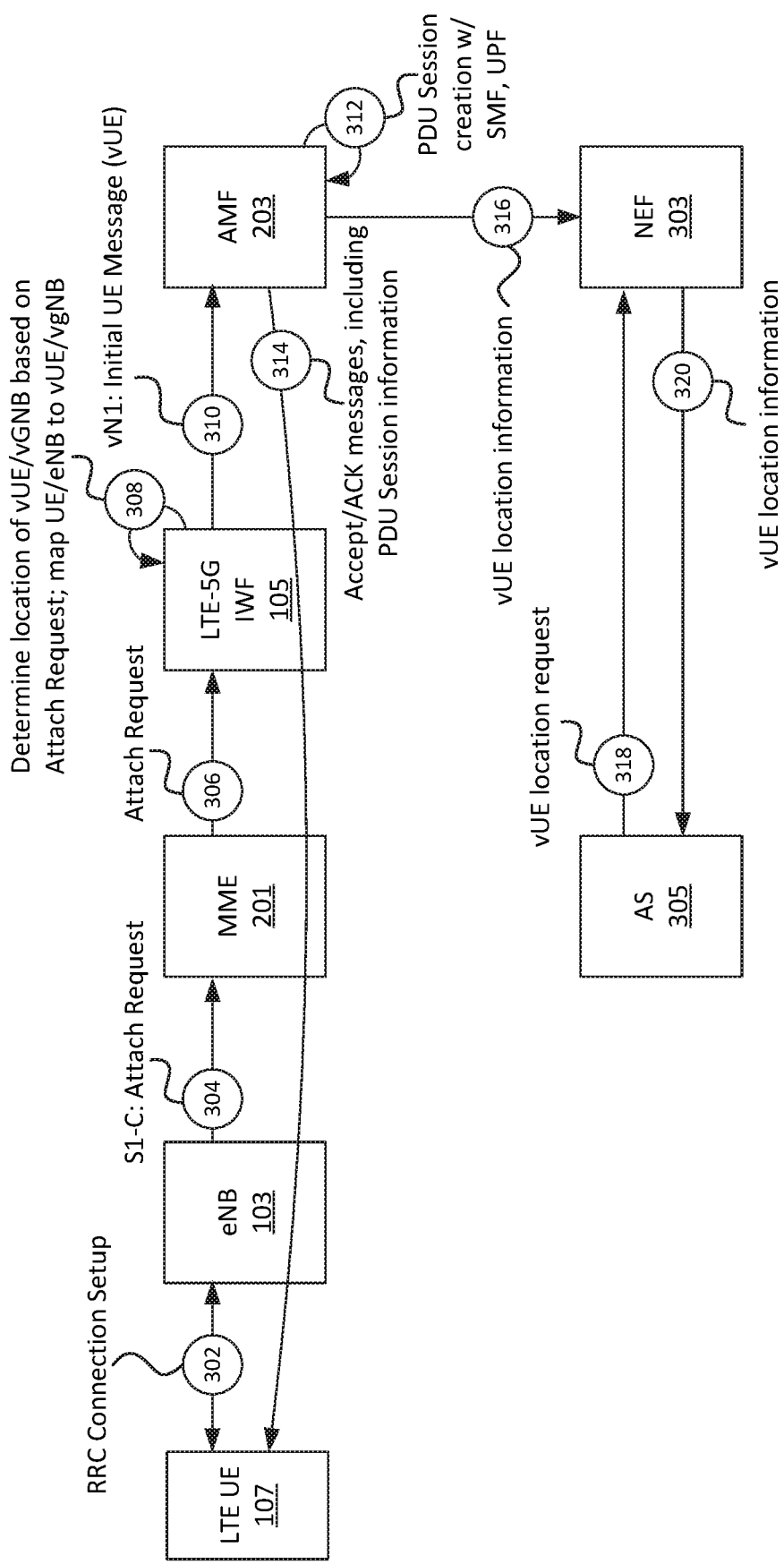
FIG. 3A illustrates example signaling, involving a LTE-5G IWF, to provide location information associated with a LTE UE to elements of a 5G core network, based on an initial registration procedure of the LTE UE with the 5G core network.

As referred to above, FIG. 3A illustrates example signaling, involving LTE-5G IWF 105, to provide location information associated with LTE UE 107 to elements of 5G core network 109, based on an initial registration procedure of LTE UE 107 with 5G core network 109. As shown, LTE UE 107 and eNB 103 may perform (at 302) an RRC Connection Setup procedure. By way of this procedure, LTE UE 107 and eNB 103 may establish an RF connection, via which LTE UE 107 and eNB 103 may communicate wirelessly. As part of this procedure, eNB 103 may receive or determine one or more identifiers associated with LTE UE 107, such as IMSI, IMEI, GUTI, and/or some other suitable identifier of LTE UE 107.

Once the RF connection between LTE UE 107 and eNB 103 has been established, eNB 103 may output (at 304) an Attach Request to MME 201. The Attach Request may be provided via an S1 interface (e.g., an S1-C interface) between eNB 103 and MME 201. The Attach Request may include one or more of the identifiers associated with LTE UE 107. The Attach Request may include location information associated with LTE UE 107. For example, the Attach Request may include a Location Area Code ("LAC"), geographic coordinates, and/or some other suitable indication of the location of LTE UE 107. The location of LTE UE 107 may be received from LTE UE 107 (e.g., during the RRC Connection Setup procedure), may be determined by eNB 103, may be determined by MME 201, and/or may be received by eNB 103 or MME 201 from some other element of LTE core network 101 not explicitly shown here.

MME 201 may, in some embodiments, be an MME that is associated with a tracking area ("TA") with which LTE UE 107 and/or eNB 103 is associated. In some embodiments, MME 201 may be communicatively coupled with LTE-5G IWF 105. MME 201 may output (at 306) an Attach Request to LTE-5G IWF 105. In some embodiments, this Attach Request (output at 306) may include the Attach Request provided by eNB 103, and/or may otherwise be based on the Attach Request provided by eNB 103. The Attach Request (output at 306) may, for example, include identifying information for LTE UE 107 and/or for eNB 103. In some embodiments, the Attach Request (output at 306) may include location information for LTE UE 107 and/or eNB 103. Additionally, or alternatively, the Attach Request may include an identifier (e.g., an "eNB-ID") of eNB 103, based on which LTE-5G IWF 105 may determine the location of eNB 103 by performing a lookup in a repository (not shown here) that maintains information that corresponds locations to eNB-IDs.

In some embodiments, MME 201 may pass through (at 306) the Attach Request (received at 304) without modifying the Attach Request. In some embodiments, an interface (e.g., an S1-C interface) may be provided directly between eNB 103 and LTE-5G IWF 105, and eNB 103 may output the Attach Request to LTE-5G IWF 105 directly (e.g., without outputting the Attach Request to MME 201) via the provided interface.

LTE-5G IWF 105 may map (at 308) LTE UE 107 to a virtual UE (e.g., 5G vUE 111) that is attached via a virtual gNB (e.g., vgNB 113). For example, LTE-5G IWF 105 may generate a set of identifiers associated with 5G vUE 111, and maintain information indicating that this set of identifiers is associated with LTE UE 107. The generated set of identifiers for 5G vUE 111 may include, for example, SUCI, SUPI, PEI, and/or some other identifier that may be used by AMF 203 and/or other elements of 5G core network 109 to identify or communicate with 5G vUE 111. In some embodiments, LTE-5G IWF 105 may generate these identifiers by performing a hash or some other function on one or more identifiers of LTE UE 107 (e.g., IMSI, IMEI, etc.). In some embodiments, LTE-5G IWF 105 may generate these identifiers in a manner independent of the identifiers of LTE UE 107 (e.g., using random and/or arbitrary identifiers). In some embodiments, LTE-5G IWF 105 may select these identifiers from a pool of available identifiers, and remove any identifiers from this pool when selecting them for 5G vUE 111 (e.g., mapping the selected identifiers to 5G vUEs that are logically associated with LTE UEs).

LTE-5G IWF 105 may also receive or maintain location information for 5G vUE 111. For example, LTE-5G IWF 105 may determine a location associated with LTE UE 107 (e.g., based on the received Attach Request), and may determine a corresponding location for 5G vUE 111. In some embodiments, the corresponding location for 5G vUE 111 may be indicated in the same manner as the location of LTE UE 107. For example, in some embodiments, the location of LTE UE 107 may be indicated as a LAC, which may be used to indicate the location of 5G vUE 111.

LTE-5G IWF 105 may additionally receive or maintain location information for vgNB 113. For example, LTE-5G IWF 105 may determine a location associated with eNB 103 (e.g., based on the received Attach Request), and may determine a corresponding location for vgNB 113. For example, the Attach Request may include an eNB-ID and/or some other identifier of eNB 103, based on which LTE-5G IWF 105 may determine a location associated with eNB 103.

Figure 3B:
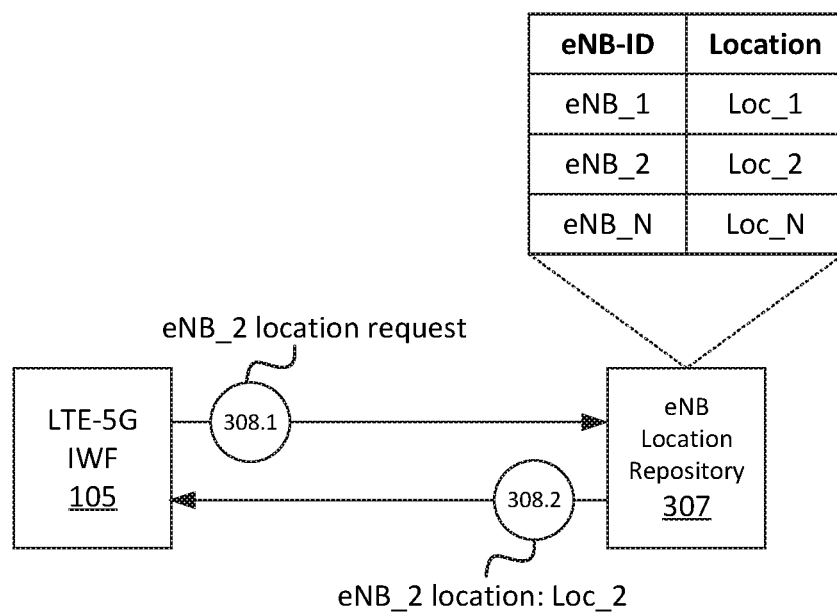
FIG. 3B illustrates the determination of a location of an evolved Node B ("eNB") to which an LTE UE is attached, for subsequent use by the LTE-5G IWF in mapping a virtual Next Generation Node B ("gNB") to the eNB.

For example, as shown in FIG. 3B, eNB location repository 307 may be a device or system that maintains information that correlates eNBs to their locations. In this example, eNBs may be indicated on the basis of eNB-ID. In practice, eNBs may be denoted using some other identifier, and/or in some other manner. eNB location repository 307 may also store location information for each eNB, illustrated as "Loc_1," "Loc_2," etc. The location information may be stored as coordinates, LACs, and/or in some other suitable manner. eNB location repository 307 may be an element of LTE core network 101, and may be communicatively coupled to, or accessible by, MME 201 and/or one or more other elements of LTE core network 101.

As shown LTE-5G IWF 105 may output (at 308.1) a location request for a particular eNB 103. In this example, for instance, LTE-5G IWF 105 may request location information for an eNB with the eNB-ID denoted as "eNB_2." eNB location repository 307 may identify that the stored information indicates that eNB_2 is associated with the location "Loc_2," and may output (at 308.2) the location information for this eNB to LTE-5G IWF 105. Referring back to FIG. 3A, in this manner, LTE-5G IWF 105 may determine a location of eNB 103 from which the Attach Request was received (at 304).

Once the location of LTE UE 107 and eNB 103 have been determined by LTE-5G IWF 105, LTE-5G IWF 105 may proceed to establish logical communications between AMF 203 and 5G vUE 111 (e.g., via a logical association between 5G vUE 111 and vgNB 113). For example, LTE-5G IWF 105 may output (at 310), via an N1 interface (e.g., a vN1 interface) between LTE-5G IWF 105 and AMF 203, an Initial UE Message. The Initial UE Message may include one or more of the identifiers for 5G vUE 111 generated or selected by LTE-5G IWF 105 (e.g., SUPI, SUCI, PEI, etc.). In some embodiments, the Initial UE Message may include one or more Protocol Data Unit ("PDU") Session IDs, which may be used to establish a PDU Session between 5G vUE 111 and the UPF of 5G core network 109, and/or AMF 203 may determine or generate one or more PDU Session IDs based on the Initial UE Message. The Initial UE Message may include location information associated with 5G vUE 111. This location information may have been determined by LTE-5G IWF 105 (at 308) based on the Attach Request received from MME 201.

As described above, the N1 interface may be provided via a "virtual" N1 interface (e.g., "vN1") between LTE-5G IWF 105 and AMF 203. For example, LTE-5G IWF 105 may send the Initial UE Message to AMF 203 in an N1 container, via an N26 interface between LTE-5G IWF 105 and AMF 203. In some embodiments, although not explicitly shown here, LTE-5G IWF 105 may instruct MME 201 to send the Initial UE Message to AMF 203 via an N26 interface between MME 201 and AMF 203. For example, LTE-5G IWF 105 may provide the Initial UE Message to MME 201 in an N1 container, along with an instruction to provide the N1 container to AMF 203 via the N26 interface. Upon receiving the Initial UE Message, AMF 203 may perform (at 312) a PDU Session creation process, which may include communicating with one or more other elements of 5G core network 109, such as a Session Management Function ("SMF") and/or a UPF.

While not discussed in detail here, the PDU Session creation process may include the generation or selection of a Core Network ("CN") Tunnel identifier ("CN Tunnel ID"), as well as the generation or selection of an IP address (e.g., an IPv4 address, an IPv6 address, and/or a portion of an IPv6 address (e.g., an IPv6 prefix)) for 5G vUE 111. As described herein, this IP address may ultimately be used by a UPF of 5G core network 109 and LTE UE 107 to establish user plane communications between the UPF and LTE UE 107. As part of this PDU Session creation process, the generated CN Tunnel ID and IP address may be provided to AMF 203 (e.g., by the SMF via an N11 interface, and/or by the UPF via an N4 interface).

Once the PDU Session creation process is complete, AMF 203 may output (at 314) one or more Registration Accept messages to LTE-5G IWF 105, which may perform further signaling with MME 201, eNB 103, and/or LTE UE 107 to establish user plane communications (e.g., via a GTP tunnel between eNB 103 and the UPF), based on the generated IP address and the CN Tunnel ID.

For example, AMF 203 may output one or more Registration Accept messages in an N1 container and an N2 container (e.g., via the "virtual" N1 and N2, or "vN1" and "vN2," interfaces between AMF 203 and LTE-5G IWF 105) to LTE-5G IWF 105. The Registration Accept messages may include information generated or received by AMF 203 as part of the PDU Session creation process (at 312). Generally, the message sent via the vN1 interface may serve to logically associate 5G vUE 111 with the PDU Session, and the message sent via the vN2 interface may serve to logically associate vgNB 113 with the PDU Session.

Thus, from the standpoint of 5G core network 109, a PDU Session has been established between the UPF and 5G vUE 111, via vgNB 113. Further, the location of 5G vUE 111 may correspond to the location of LTE UE 107, and the location of vgNB 113 may correspond to the location of eNB 103.

In some embodiments, LTE-5G IWF 105 may map the CN Tunnel ID to another type of identifier (e.g., a Tunnel Endpoint Identifier ("TEID")) for use by eNB 103 and/or LTE UE 107. In some embodiments, LTE-5G IWF 105 may provide (at 314) an Attach Accept message to MME 201 and/or to eNB 103 via an S1 interface (e.g., via an S1-C interface). Based on the information received in the Attach Accept message, eNB 103 may establish communications (e.g., an Evolved Packet System ("EPS") bearer) with the UPF via a GTP Tunnel (established based on the provided CN Tunnel ID associated with the UPF and/or the TED provided by LTE-5G IWF 105). The established communications (e.g., GTP tunnel carrying a PDU Session, EPS Bearer, etc.) between eNB 103 and the UPF may enable LTE UE 107 to communicate user plane traffic with the UPF.

As further shown, AMF 203 may provide (at 316) location information, associated with 5G vUE 111, to NEF 303. In some embodiments, AMF 203 may provide the location information "directly" through an interface between AMF 203 and NEF 303, while in some embodiments, AMF 203 may provide the location information "indirectly" to NEF 303 (e.g., by providing the location information to another device or system, which provides the location information to NEF 303). NEF may be an element of 5G core network 109, which maintains and provides information to authorized devices or systems that are "external" to 5G core network 109, such as AS 305. That is, AS 305 and NEF 303 may communicate via one or more communication pathways that are "external" to 5G core network 109, such as the Internet.

AS 305 may be a device or system that is authorized to request location information for 5G vUE 111, such as an AS associated with one or more applications being utilized by 5G vUE 111. As one example, LTE UE 107 may be engaged in a video call, for which AS 305 provides video call services. While authentication and/or authorization are not discussed here, assume that NEF 303 determines that AS 305 is authorized to obtain the location of LTE UE 107. In response to a request (at 318) from AS 305, NEF 303 may provide (at 320) requested location information.

In this example, the location request (at 318) may be on the basis of identifying information associated with 5G vUE 111. For example, AS 305 may have received identifying information for 5G vUE 111 (which has been mapped to LTE UE 107), such as a SUPI, SUCI, etc. As another example, AS 305 may have received the IP address associated with 5G vUE 111 and/or with LTE UE 107 (e.g., the IP address may have been received through user plane communications with LTE UE 107). Based on this identifying information, and based on the location information for 5G vUE 111 (received at 316), NEF 303 may identify the requested location information. While shown in this figure as the location information being provided (at 316) to NEF 303 before the location is requested (at 318), in some embodiments, NEF 303 may obtain or request the location (e.g., at 316) after receiving a request for the location from AS 305 (at 318) and/or some other device.

Figure 4:
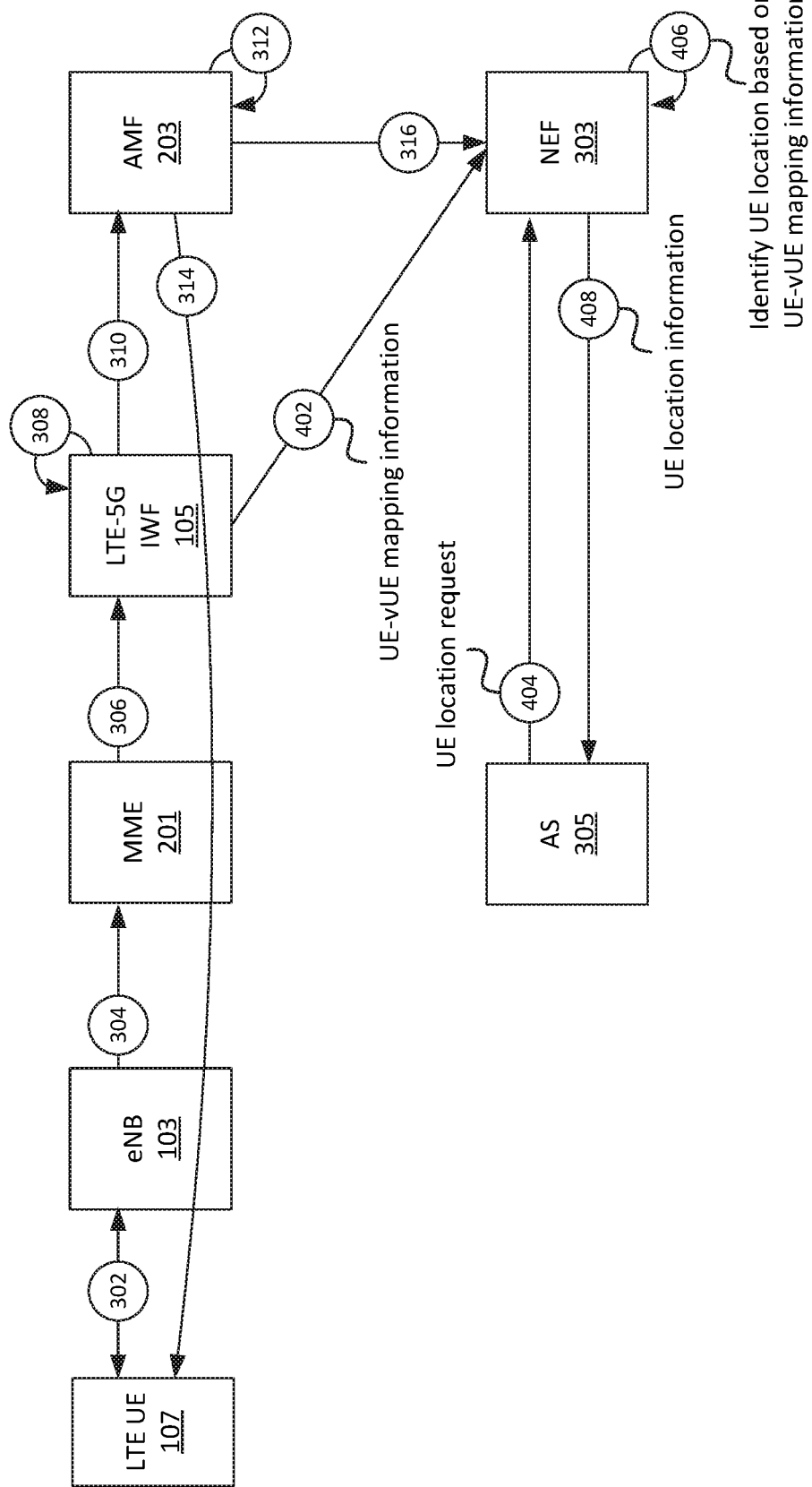
FIGS. 4 and 5 provide further examples of signaling, involving a LTE-5G IWF, to provide location information associated with a LTE UE to elements of a 5G core network, based on an initial registration procedure of the LTE UE with the 5G core network.
Figure 5:
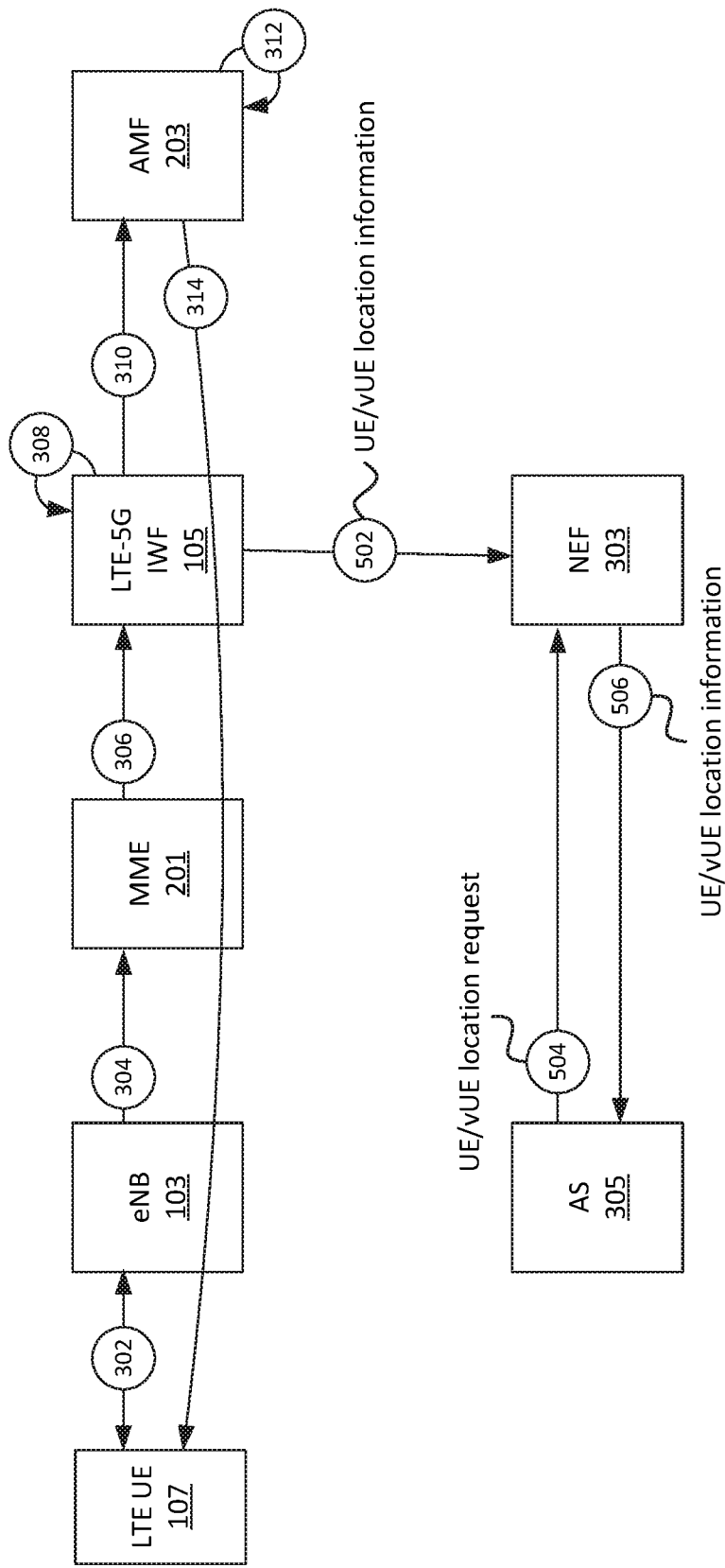

FIGS. 4 and 5 illustrate further examples of signaling based on which NEF 303 may maintain and provide location information for LTE UE 107. Some of the signals shown in FIGS. 4 and 5 are the same or similar to corresponding signals shown in FIG. 3A, and are not described again herein for brevity. As shown in FIG. 4, for instance, NEF 303 may receive (at 402) UE-vUE mapping information, which maps one or more identifiers of 5G vUE 111 to one or more identifiers associated with LTE UE 107. For example, this mapping information may map a SUPI, SUCI, etc. to one or more other identifiers, such as an IMEI, IMSI, etc. As another example, the mapping information may map one or more identifiers of 5G vUE 111 to other types of identifiers, such as an MDN, user name, and/or other identifier. For example, LTE-5G IWF 105 may receive these other types of identifiers from AS 305, a Home Subscriber Server ("HSS") of LTE core network 101, and/or from some other source.

For example, LTE-5G IWF 105 may receive an indication from AS 305 that a user named "John Doe" has a phone number of "123-456-7890" and is associated with a user name of "johndoe." Further, LTE-5G IWF 105 may receive an indication from the HSS (and/or some other source) that a UE with IMEI "123456789012345" is associated with the MDN "123-456-7890" and is associated with a user named "John Doe." Thus, LTE-5G IWF 105 may provide (at 402) information indicating that a user name of "johndoe" is associated with this particular user for services associated with this particular AS 305, and further that the user "johndoe" is associated with LTE UE 107 having the IMEI of "123456789012345."

As further shown, AS 305 may request (at 404) location information associated with LTE UE 107. For example, AS 305 may request the location information based on an LTE-based identifier (e.g., IMEI, IMSI, etc.) and/or some other identifier (e.g., user name, MDN, etc.). Based on the UE-vUE mapping information (received at 402), and further based on earlier mapping performed (at 308) to associate LTE UE 107 to 5G vUE 111, NEF 303 may identify (at 406) location information for a corresponding 5G vUE 111 (e.g., as received from AMF 203 at 316). That is, while AMF 203 may have provided location information in a manner that is associated with 5G vUE 111, NEF 303 may identify (at 406) location information for a corresponding LTE UE 107 based on the association of LTE UE 107 to 5G vUE 111. NEF 303 may provide (at 408) the requested location information, associated with LTE UE 107, to AS 305.

As shown in FIG. 5, NEF 303 may receive (at 502) location information for LTE UE 107 or 5G vUE 111. That is, LTE-5G IWF 105 may provide the location information for LTE UE 107 (received at 306) and/or the location information for 5G vUE 111 (determined at 308). LTE-5G IWF 105 may provide suitable identifiers with the location information to NEF 303, to facilitate the determination of the location by NEF 303, on the basis of identifiers associated with LTE UE 107 and/or with 5G vUE 111. For example, AS 305 may request (at 504) a location of LTE UE 107, and NEF 303 may output (at 506) the location information of LTE UE 107. Additionally, or alternatively, AS 305 may request (at 504) a location of 5G vUE 111, and NEF 303 may output (at 506) the location information of 5G vUE 111.

In the manner described above (e.g., with respect to FIGS. 3A, 4, and 5), while LTE UE 107 maintains an RF connection with eNB 103 of an LTE RAN, the user plane traffic may be handled by 5G core network 109 instead of by LTE core network 101. The described processes further allow for location-based or location-aware services, that communicate with 5G core network 109, to obtain location information for LTE UE 107, even though LTE UE 107 is represented by "virtual" elements interacting with p109 (e.g., 5G vUE 111, via vgNB 113).

Handling the traffic by 5G core network 109 may aid in the transition of the utilization of 5G technologies as they become more prevalent. Additionally, 5G core network 109 may be capable of providing additional or enhanced services, as compared to LTE core network 101. Further, leveraging the continued use of currently deployed LTE architecture (e.g., existing LTE RANs) in conjunction with elements of a 5G core network may facilitate the more rapid deployment of 5G technologies without requiring the decommissioning, removal, or non-utilization of existing LTE architecture.

Figure 6:
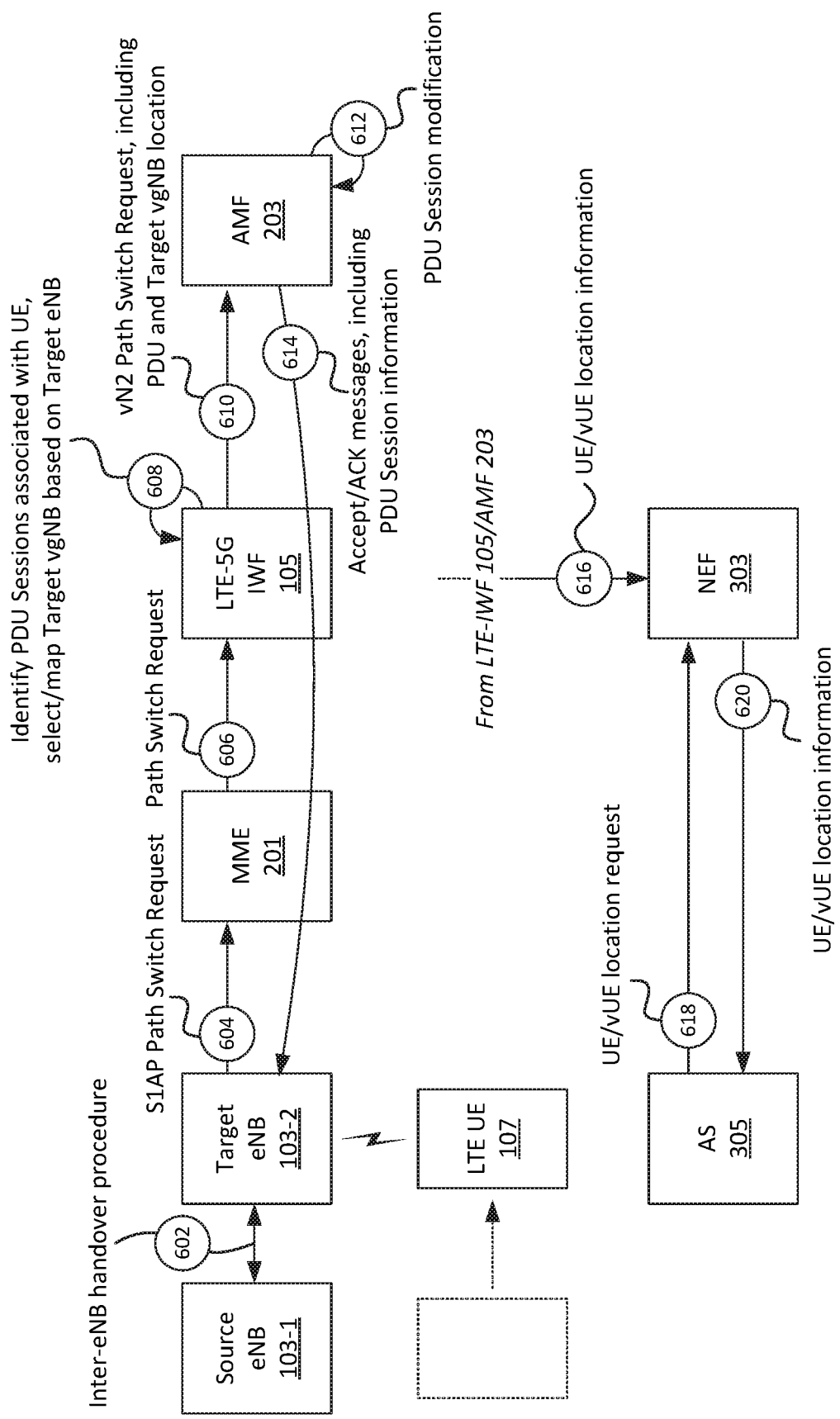
FIG. 6 illustrates example signaling, involving a LTE-5G IWF, to provide location information associated with a LTE UE to elements of a 5G core network, based on a handover of the UE between evolved Node Bs ("eNBs")

FIG. 6 illustrates example signaling, in accordance with some embodiments, to provide updated location information associated with LTE UE 107 to elements of a 5G core network, based on a handover of LTE UE 107 between eNBs 103. For example, as shown, LTE UE 107 may be handed over from Source eNB 103-1 to Target eNB 103-2. For example, eNB 103-1 and eNB 103-2 may perform (at 602) an inter-eNB handover procedure via an X2 interface between eNB 103-1 and eNB 103-2. In this example, eNB 103-1 and eNB 103-2 may be associated with the same MME 201. For example, MME 201 may be associated with TA in which eNB 103-1 and eNB 103-2 are both located. For the sake of brevity, the procedure is shown in the figure as one double-sided arrow (602); in practice, this procedure may include multiple signals passed between eNB 103-1, eNB 103-2, and LTE UE 107. As part of this procedure, eNB 103-2 may receive information indicating one or more GTP tunnels associated with eNB 103-1 and/or EPS Bearer IDs of EPS Bearers carried by the one or more GTP tunnels. For example, the GTP tunnels may include a GTP tunnel between eNB 103-1 and 5G core network 109 (e.g., a UPF of 5G core network 109). The information may include, for example, one or more TEIDs associated with such a GTP tunnel and/or EPS Bearer IDs carried by such GTP tunnels.

ENB 103-2 may output (at 604) a S1AP Path Switch Request to MME 201. The S1AP Path Switch Request may include the TED of one or more GTP tunnels to be switched to eNB 103-2, and/or may include EPS Bearer IDs of one or more EPS Bearers carrying user plane traffic (e.g., as carried by the one or more GTP tunnels). MME 201 may forward (at 606) some or all of the information included in the S1AP Path Switch Request to LTE-5G IWF 105. The S1AP Path Switch Request may include an identifier of eNB 103-2, such as an eNB-ID of eNB 103-2. In some embodiments, the S1AP Path Switch Request may include information indicating a location of eNB 103-2, such as a LAC and/or some other indicator of location.

In some embodiments, the S1AP Path Switch Request may be provided via an S1 interface between eNB 103-2 and MME 201, and then forwarded by MME 201 to LTE-5G IWF 105 via some suitable communication pathway between MME 201 and LTE-5G IWF 105. In some embodiments, eNB 103-2 may "directly" provide the S1AP Path Switch Request to LTE-5G IWF 105 via an S1 interface (and/or some other interface) provided between eNB 103-2 and LTE-5G IWF 105.

LTE-5G IWF 105 may identify (at 608) one or more PDU Sessions associated with UE 107. For example, as discussed above, LTE-5G IWF 105 may maintain a mapping between EPS Bearer IDs, associated with LTE UE 107, and PDU Sessions logically associated with 5G vUE 111. In some embodiments, LTE-5G IWF 105 may identify one or more GTP Tunnels associated with LTE UE 107. For example, LTE-5G IWF 105 may maintain a mapping between TEIDs, of one or more GTP tunnels associated with LTE UE 107, and CN Tunnel IDs of one or more GTP tunnels logically associated with 5G vUE 111.

LTE-5G IWF 105 may logically generate and/or select a particular vgNB 113 to associate with eNB 103-2, based on the location of eNB 103-2. In some embodiments, LTE-5G IWF 105 may determine a location associated with eNB 103-2. For example, LTE-5G IWF 105 may determine the location of eNB 103-2 based on location information (e.g., a LAC) provided in the S1AP Path Switch Request, may determine the location of eNB 103-2 in a manner similar to that described above with respect to FIG. 3B (e.g., by querying eNB location repository 307 based on an eNB-ID of eNB 103-2), and/or may determine the location of eNB 103-2 in some other suitable manner. LTE-5G IWF 105 may logically generate a target vgNB 113 having the same location as eNB 103-2 (and/or a location that is derived from the determined location of eNB 103-2), and/or may select target vgNB 113 from a pool of vgNBs. For example, if selecting from a pool of vgNBs, LTE-5G IWF 105 may select a particular vgNB 113 having a closest location to the determined location of eNB 103-2. LTE-5G IWF 105 may maintain information logically associating 5G vUE 111 with the generated or selected target vgNB 113 (e.g., in lieu of a previously associated vgNB 113).

As part of the logical handover of 5G vUE 111 to target vgNB 113, LTE-5G IWF 105 may output (at 610) a Path Switch Request to AMF 203. The Path Switch Request (at 610) may be provided via the vN2 interface between LTE-5G IWF 105 and AMF 203. For example, this request may be included in an N2 container via an N26 interface between LTE-5G IWF 105 and AMF 203. This Path Switch Request (at 610) may include identifiers of the PDU Sessions logically associated with 5G vUE 111 (e.g., mapped to EPS Bearers associated with LTE UE 107). In some embodiments, the Path Switch Request may include one or more CN Tunnel IDs of one or more GTP Tunnels to be switched. For example, the CN Tunnel IDs may be logically associated with a source vgNB 113, from which 5G vUE 111 is being logically handed over to the target vgNB 113. As mentioned above, the mapping information maintained by LTE-5G IWF 105 may serve to associate these CN Tunnel IDs with one or more TEIDs, which may be used by eNB 103-1 and/or eNB 103-2.

The Path Switch Request (at 610) may also include location information associated with target vgNB 113. For example, as similarly discussed above, the location information may be in the form of a LAC and/or some other suitable indicator of location. Elements of 5G core network 109 may perform (at 612) a PDU Session modification procedure based on the Path Switch Request (provided at 610). For example, AMF 203, an SMF, and/or a UPF of 5G core network 109 may switch the user plane data from the one or more GTP Tunnels indicated in the Path Switch Request to one or more GTP Tunnels between the UPF and target vgNB 113. For example, 5G core network 109 (e.g., AMF 203, the SMF, the UPF, etc.) may generate or select one or more CN Tunnel IDs for the GTP Tunnel(s) between the UPF and target vgNB 113.

AMF 203 may output (at 614) one or more Acceptance messages, acknowledgement ("ACK") messages, or the like, indicating that the PDU Session(s) has/have been modified. For example, AMF 203 may output a Path Switch Request ACK message to LTE-5G IWF 105, including the one or more CN Tunnel IDs (generated or selected at 612). LTE-5G IWF 105 may generate or select one or more TEIDs to map to these CN Tunnel IDs, and provide the TEID(s) to eNB 103-2, to facilitate the handing over of user plane communications from eNB 103-1 to eNB 103-2. For example, MME 201 may output (at 614) an S1AP Path Switch Request ACK message, including the one or more TEIDs generated or selected by LTE-5G IWF 105, which eNB 103-2 may use to communicate with the UPF of 5G core network 109.

As further shown, LTE-5G IWF 105 and/or AMF 203 may provide (at 616) location information associated with LTE UE 107 and/or 5G vUE 111 to NEF 303. For example, as similarly shown in FIGS. 3A, 4, and 5, the location information may be provided by LTE-5G IWF 105, AMF 203, and/or may be determined based on information provided by both LTE-5G IWF 105 and AMF 203. Thus, AS 305 may request (at 618) location information for LTE UE 107 and/or 5G vUE 111, and NEF 303 may provide (at 620) the requested location information. As discussed above, NEF 303 may perform authentication, authorization, verification, etc. procedures to verify that AS 305 is authorized to request this information before providing the information. Based on the techniques described above, 5G core network 109 may be able to maintain accurate location information for LTE UE 107, even when LTE UE 107 moves across eNBs 103 of an LTE RAN.

Figure 7:
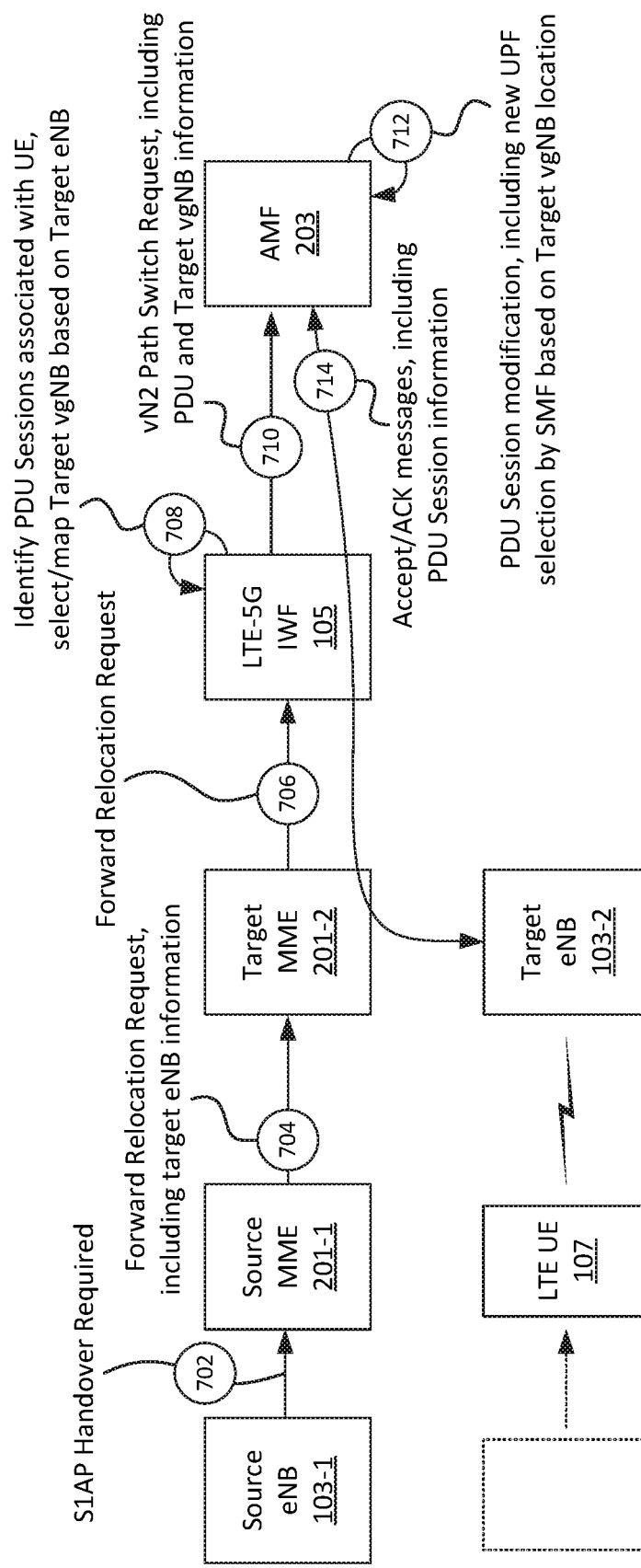
FIG. 7 illustrates example signaling, involving a LTE-5G IWF, to provide location information associated with a LTE UE to elements of a 5G core network, based on a handover of the UE between eNBs that are associated with different Mobility and Management Entities ("MMEs")

FIG. 7 illustrates example signaling to provide location information associated with LTE UE 107 to elements of 5G core network 109, based on a handover of LTE UE 107 between eNBs 103 that are associated with different MMEs 201. In this example, for instance, eNB 103-1 and eNB 103-2 may be associated with MME 201-1 and MME 201-2, respectively. For example, eNB 103-1 and eNB 103-2 may be located in different TAs, where one TA is associated with MME 201-1 and the other TA is associated with MME 201-2.

As shown, eNB 103-1 may output (at 702) an S1AP Handover Required message to MME 201-1. This message may indicate, to MME 201-1, that LTE UE 107 should be handed over from eNB 103-1 to another eNB 103. For example, eNB 103-1 may output this message based on signal quality measurements of RF communications between LTE UE 107 and eNB 103-1, and/or based on other factors. MME 201-1 may select eNB 103-2 and/or MME 201-2 in accordance with a suitable selection process, and may output (at 704) a Forward Relocation Request to MME 201-2. The Forward Relocation Request may include an identifier (e.g., an eNB-ID of eNB 103-2), as well as an identifier (e.g., IMSI, IMEI, etc.) of LTE UE 107. In some embodiments, MME 201-2 may select eNB 103-2. In some embodiments, the Forward Relocation Request may include one or more EPS Bearer IDs associated with user plane communications between LTE UE 107 and 5G core network 109.

MME 201-2 may output (at 706) some or all of the information included in the Forward Relocation Request to LTE-5G IWF 105. In some embodiments, MME 201-2 may pass through the Forward Relocation Request (received at 704) to LTE-5G IWF 105, and/or may generate a new message that includes some or all of the information included in the Forward Relocation Request (received at 704).

LTE-5G IWF 105 may identify (at 708) one or more PDU Sessions associated with UE 107. For example, as discussed above, LTE-5G IWF 105 may maintain a mapping between EPS Bearer IDs, associated with LTE UE 107, and PDU Sessions logically associated with 5G vUE 111. In some embodiments, LTE-5G IWF 105 may identify one or more GTP Tunnels associated with LTE UE 107 (e.g., based on a mapping between TEIDs, of one or more GTP tunnels associated with LTE UE 107, and CN Tunnel IDs of one or more GTP tunnels logically associated with 5G vUE 111).

LTE-5G IWF 105 may logically generate and/or select a particular vgNB 113 to associate with eNB 103-2, based on the location of eNB 103-2. In some embodiments, LTE-5G IWF 105 may determine a location associated with eNB 103-2. For example, LTE-5G IWF 105 may determine the location of eNB 103-2 based on information provided in the Forward Relocation Request. For example, as similarly described above with respect to FIG. 3B, LTE-5G IWF 105 may query eNB location repository 307 based on an eNB-ID of eNB 103-2 to determine the location of eNB 103-2 in some other suitable manner. Additionally, or alternatively, the Forward Relocation Request may include location information associated with eNB 103-2 (e.g., a LAC and/or some other suitable indicator of location).

LTE-5G IWF 105 may logically generate a target vgNB 113 having the same location as eNB 103-2 (and/or a location that is derived from the determined location of eNB 103-2), and/or may select target vgNB 113 from a pool of vgNBs, and may maintain information logically associating 5G vUE 111 with the generated or selected target vgNB 113. As part of the logical handover of 5G vUE 111 to target vgNB 113, LTE-5G IWF 105 may output (at 710) a Path Switch Request to AMF 203 (e.g., via the vN2 interface between LTE-5G IWF 105 and AMF 203, as similarly discussed above). This Path Switch Request (at 710) may include identifiers of the PDU Sessions logically associated with 5G vUE 111 (e.g., mapped to EPS Bearers associated with LTE UE 107). In some embodiments, the Path Switch Request may include one or more CN Tunnel IDs of one or more GTP Tunnels to be switched, as also similarly discussed above with respect to FIG. 6.

The Path Switch Request (at 710) may also include location information associated with target vgNB 113. For example, as similarly discussed above, the location information may be in the form of a LAC and/or some other suitable indicator of location. Elements of 5G core network 109 may perform (at 712) a PDU Session modification procedure based on the Path Switch Request (provided at 710). For example, AMF 203, an SMF, and/or a UPF of 5G core network 109 may switch the user plane data from the one or more GTP Tunnels indicated in the Path Switch Request to one or more GTP Tunnels between the UPF and target vgNB 113. For example, 5G core network 109 (e.g., AMF 203, the SMF, the UPF, etc.) may generate or select one or more CN Tunnel IDs for the GTP Tunnel(s) between the UPF and target vgNB 113.

AMF 203 may output (at 714) one or more Acceptance messages, ACK messages, or the like, indicating that the PDU Session(s) has/have been modified. For example, AMF 203 may output a Path Switch Request ACK message to LTE-5G IWF 105, including the one or more CN Tunnel IDs (generated or selected at 612). LTE-5G IWF 105 may generate or select one or more TEIDs to map to these CN Tunnel IDs, and provide the TEID(s) to eNB 103-2, to facilitate the handing over of user plane communications from eNB 103-1 to eNB 103-2. For example, MME 201 may output (at 714) an S1AP Path Switch Request ACK message, including the one or more TEIDs generated or selected by LTE-5G IWF 105, which eNB 103-2 may use to communicate with the UPF of 5G core network 109.

While not shown in this figure, LTE-5G IWF 105 and/or AMF 203 may provide location information associated with LTE UE 107 and/or 5G vUE 111 to NEF 303 and/or some other device or system (e.g., as similarly described above with respect to FIG. 6). Thus, AS 305 and/or some other device or system may be able to obtain location information for LTE UE 107, even when LTE UE 107 moves across eNBs 103 (associated with different MMEs 201) of an LTE RAN.

Figure 8:
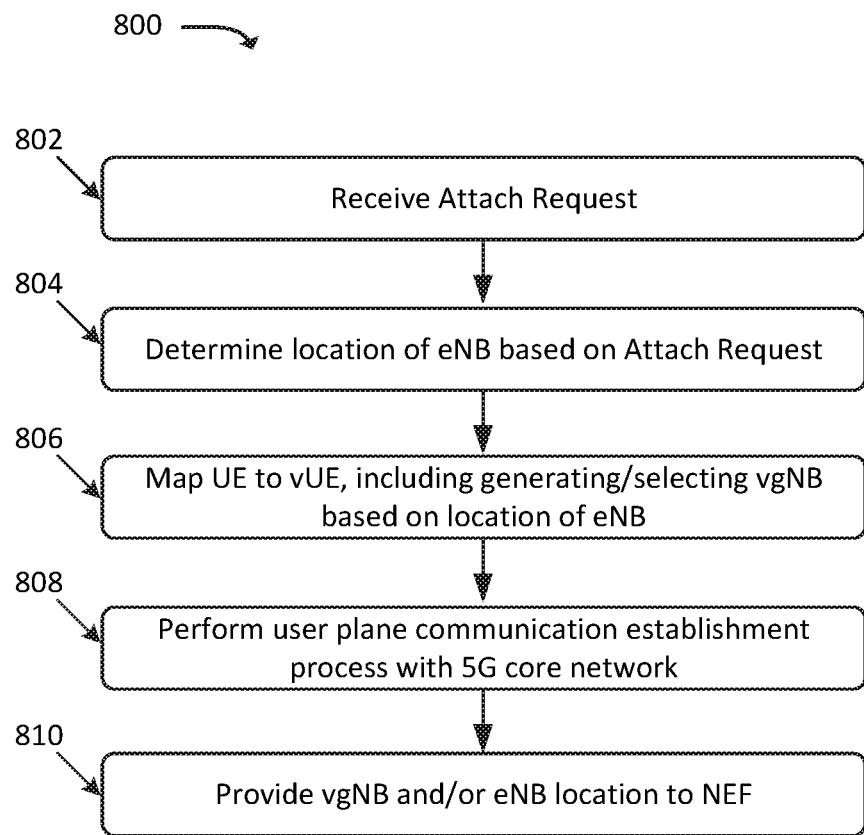
FIG. 8 illustrates an example process for providing location information, associated with an LTE UE, to elements of a 5G core network, based on an initial registration procedure of the LTE UE with the 5G core network.

FIG. 8 illustrates an example process 800 for providing location information, associated with LTE UE 107, to elements of 5G core network 109, based on an initial registration procedure of LTE UE 107 with 5G core network 109. In some embodiments, some or all of process 800 may be performed by LTE-5G IWF 105. In some embodiments, one or more other devices may perform some or all of process 800 (e.g., in concert with, and/or in lieu of, LTE-5G IWF 105).

As shown, process 800 may include receiving (at 802) an Attach Request. For example, as discussed above, LTE-5G IWF 105 may receive the Attach Request from MME 201 and/or from eNB 103, based on a connection of LTE UE 107 to eNB 103. In some embodiments, the Attach Request may be received via an S1-C or other suitable interface.

Process 800 may further include determining (at 804) a location of eNB 103 based on the received Attach Request. For example, the Attach Request may include a LAC and/or other indicator of location of eNB 103 and/or of LTE UE 107, and/or LTE-5G IWF 105 may determine the location of eNB 103 based on an eNB-ID of eNB 103 included in the Attach Request (e.g., by performing a query with eNB location repository 307 based on the eNB-ID).

Process 800 may additionally include mapping (at 806) LTE UE 107 to 5G vUE 111, which may include generating and/or selecting vgNB 113 based on the determined location of eNB 103. For example, as discussed above, LTE-5G IWF 105 may logically associate LTE UE 107 with 5G vUE 111, and may further maintain information indicating that 5G vUE 111 is logically connected to vgNB 113. LTE-5G IWF 105 may logically generate vgNB 113 with a location that is based on the determined location of LTE UE 107 and/or of eNB 103, and/or may select vgNB 113 from a pool of vgNBs (e.g., which have predefined locations) based on a comparison of the locations of the vgNBs in the pool to the determined location of LTE UE 107 and/or of eNB 103.

Process 800 may also include performing (at 808) a user plane communication establishment process with 5G core network 109. For example, LTE-5G IWF 105 may communicate with AMF 203 of 5G core network 109, which may communicate with other elements of 5G core network 109 (e.g., a SMF, a UPF, etc.) to establish one or more PDU Sessions, GTP tunnels, or the like. As discussed above, as part of this process, LTE-5G IWF 105 may map 5G GTP tunnel identifiers (e.g., CN Tunnel IDs) to LTE GTP tunnel identifiers (e.g., TEIDs), and/or may map PDU Session identifiers to EPS Bearer identifiers, to facilitate the establishment of user plane communications between LTE UE 107 and 5G core network 109.

Process 800 may further include providing (at 810) location information, associated with vgNB 113 and/or eNB 103, to NEF 303. For example, LTE-5G IWF 105 may "directly" provide the location information, associated with vgNB 113 and/or eNB 103, to NEF 303. In some embodiments, AMF 203 may provide location information, associated with vgNB 113, to NEF 303. In some embodiments, LTE-5G IWF 105 and AMF 203 may both provide information (e.g., location information associated with 5G vUE 111 and mapping information, mapping LTE UE 107 to 5G vUE 111) to NEF 303. In this manner, NEF 303 may be able to respond to requests (e.g., from AS 305) for location information associated with LTE UE 107 and/or 5G vUE 111.

Figure 9:
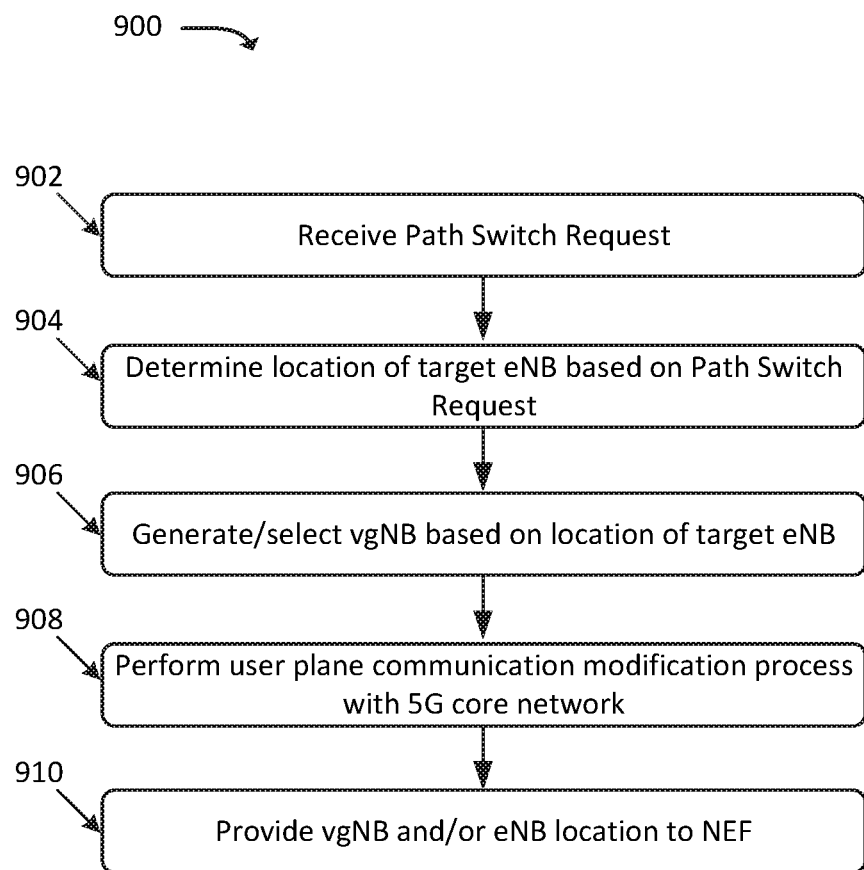
FIG. 9 illustrates an example process for providing location information, associated with an LTE UE, to elements of a 5G core network, based on a handover of the LTE UE from one eNB to another.

FIG. 9 illustrates an example process for providing location information, associated with LTE UE 107, to elements of 5G core network 109, based on a handover of LTE UE 107 from one eNB 103 to another. In some embodiments, some or all of process 800 may be performed by LTE-5G IWF 105. In some embodiments, one or more other devices may perform some or all of process 800 (e.g., in concert with, and/or in lieu of, LTE-5G IWF 105).

As shown, process 900 may include receiving (at 902) a Path Switch Request. The Path Switch Request may be received from, for example, MME 201 and/or from a target eNB 103 (e.g., a particular eNB 103 to which LTE UE 107 is being handed over).

Process 900 may further include determining (at 904) a location of target eNB 103 based on the Path Switch Request. For example, the Path Switch Request may include a LAC and/or other indicator of location of eNB 103 and/or of LTE UE 107, and/or LTE-5G IWF 105 may determine the location of eNB 103 based on an eNB-ID of eNB 103 included in the Path Switch Request (e.g., by performing a query with eNB location repository 307 based on the eNB-ID).

Process 900 may additionally include generating and/or selecting (at 906) vgNB 113 based on the location of eNB 103. For example, as discussed above, LTE-5G IWF 105 may logically generate vgNB 113 with a location that is based on the determined location of LTE UE 107 and/or of eNB 103, and/or may select vgNB 113 from a pool of vgNBs (e.g., which have predefined locations) based on a comparison of the locations of the vgNBs in the pool to the determined location of LTE UE 107 and/or of eNB 103.

Process 900 may also include performing (at 908) a user plane communication modification process with elements of 5G core network 109. For example, LTE-5G IWF 105 may communicate with AMF 203 of 5G core network 109, which may communicate with other elements of 5G core network 109 (e.g., a SMF, a UPF, etc.) to modify one or more PDU Sessions, GTP tunnels, or the like. As discussed above, as part of this process, LTE-5G IWF 105 may map 5G GTP tunnel identifiers (e.g., CN Tunnel IDs) to LTE GTP tunnel identifiers (e.g., TEIDs), and/or may map PDU Session identifiers to EPS Bearer identifiers, to facilitate the modification of user plane communications between LTE UE 107 and 5G core network 109, such that the GTP tunnel(s) carrying user plane communications are switched from source eNB 103 to target eNB 103.

Process 900 may further include providing (at 910) location information, associated with target vgNB 113 and/or target eNB 103, to NEF 303. As similarly discussed above, in this manner, NEF 303 may be able to respond to requests (e.g., from AS 305) for location information associated with LTE UE 107 and/or 5G vUE 111, even when LTE UE 107 is handed over between eNBs 103 of an LTE RAN.

Figure 10:
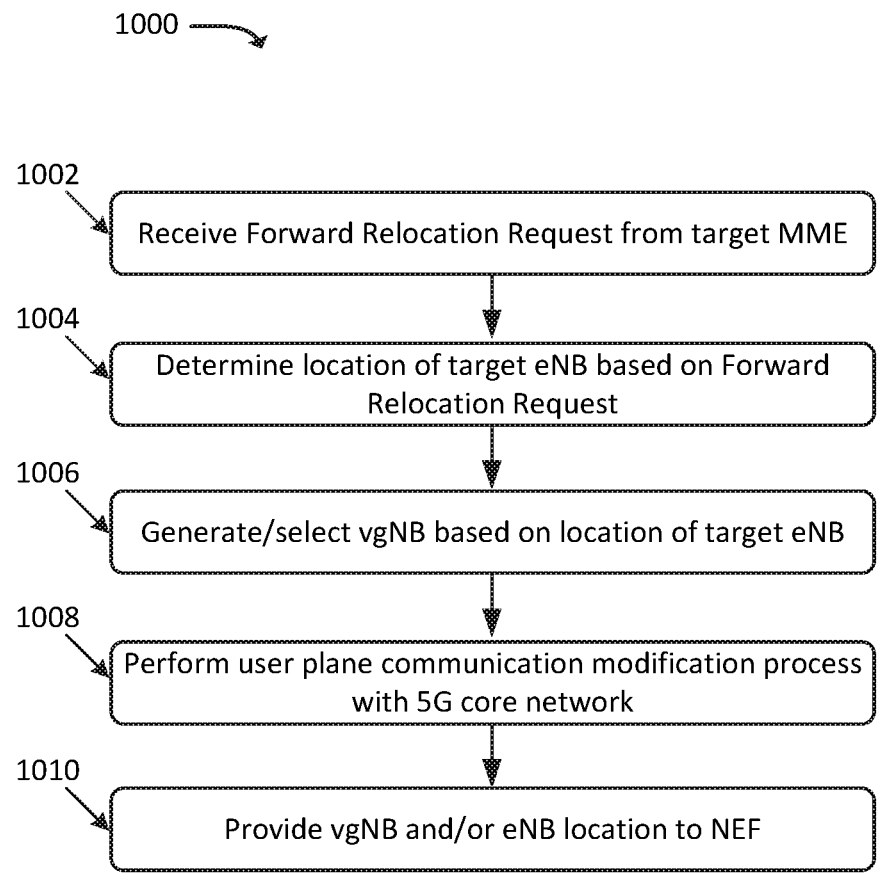
FIG. 10 illustrates an example process for providing location information, associated with an LTE UE, to elements of a 5G core network, based on a handover of the LTE UE from an eNB, associated with a first MME, to an eNB associated with a second MME.

FIG. 10 illustrates an example process for providing location information, associated with LTE UE 107, to elements of 5G core network 109, based on a handover of LTE UE 107 from a source eNB 103-1, associated with a source MME 201-1, to target eNB 103-2 associated with a second MME 201-2. In some embodiments, some or all of process 800 may be performed by LTE-5G IWF 105. In some embodiments, one or more other devices may perform some or all of process 800 (e.g., in concert with, and/or in lieu of, LTE-5G IWF 105).

As shown, process 1000 may include receiving (at 1002) a Forward Relocation Request from target MME 201. The Forward Relocation Request may be received from, for example, a target MME 201 associated with a target eNB 103, to which LTE UE 107 is being handed over.

Process 1000 may further include determining (at 1004) a location of target eNB 103 based on the Forward Relocation Request. For example, the Forward Relocation Request may include a LAC and/or other indicator of location of eNB 103 and/or of LTE UE 107, and/or LTE-5G IWF 105 may determine the location of eNB 103 based on an eNB-ID of eNB 103 included in the Forward Relocation Request (e.g., by performing a query with eNB location repository 307 based on the eNB-ID).

Process 1000 may additionally include generating and/or selecting (at 1006) target vgNB 113 based on the determined location of target eNB 103. For example, as discussed above, LTE-5G IWF 105 may logically generate vgNB 113 with a location that is based on the determined location of LTE UE 107 and/or of eNB 103, and/or may select vgNB 113 from a pool of vgNBs (e.g., which have predefined locations) based on a comparison of the locations of the vgNBs in the pool to the determined location of LTE UE 107 and/or of eNB 103.

Process 1000 may also include performing (at 1008) a user plane communication modification process with elements of 5G core network 109. For example, LTE-5G IWF 105 may communicate with AMF 203 of 5G core network 109, which may communicate with other elements of 5G core network 109 (e.g., a SMF, a UPF, etc.) to modify one or more PDU Sessions, GTP tunnels, or the like. As discussed above, as part of this process, LTE-5G IWF 105 may map 5G GTP tunnel identifiers (e.g., CN Tunnel IDs) to LTE GTP tunnel identifiers (e.g., TEIDs), and/or may map PDU Session identifiers to EPS Bearer identifiers, to facilitate the modification of user plane communications between LTE UE 107 and 5G core network 109, such that the GTP tunnel(s) carrying user plane communications are switched from source eNB 103 to target eNB 103.

Process 1000 may further include providing (at 1010) location information, associated with target vgNB 113 and/or target eNB 103, to NEF 303. As similarly discussed above, in this manner, NEF 303 may be able to respond to requests (e.g., from AS 305) for location information associated with LTE UE 107 and/or 5G vUE 111, even when LTE UE 107 is handed over between eNBs 103 of an LTE RAN.

Figure 11:
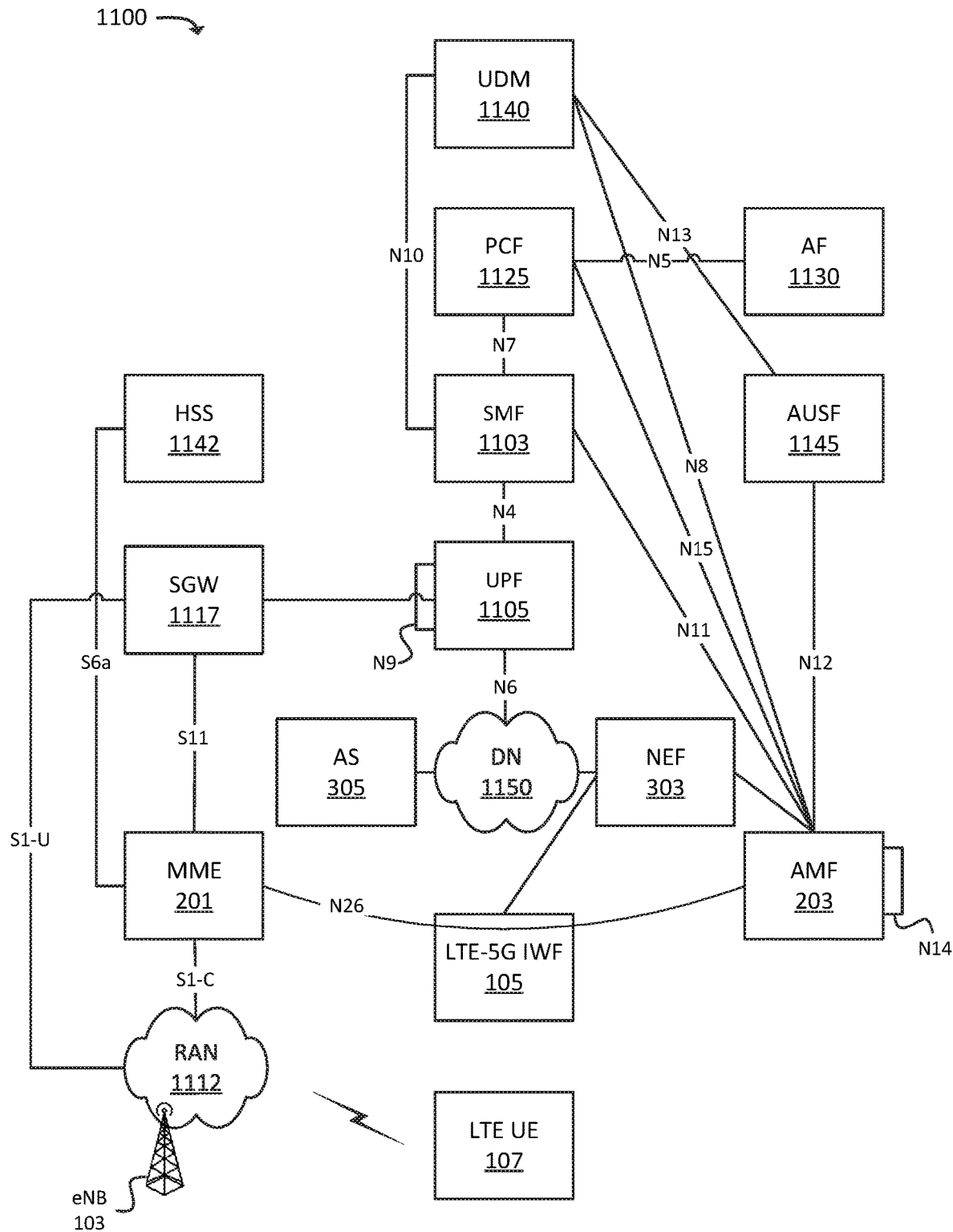
FIG. 11 illustrates an example environment, in which one or more embodiments described herein may be implemented.

FIG. 11 illustrates an example environment 1100, in which one or more embodiments may be implemented. In some embodiments, environment 1100 may include elements of a 5G core network. In some embodiments, environment 1100 may correspond to a 5G Non-Standalone ("NSA") architecture, in which a LTE RAT may be used in conjunction with a 5G core network. While not explicitly shown here, similar concepts may apply in environments that include an LTE core network and/or a 5G RAN that implements one or more 5G RATs.

As shown, environment 1100 may include LTE UE 107, LTE RAN 1112 (which may include one or more one or more eNBs 103), MME 201, AMF 203, NEF 303, SMF 1103, Policy Control Function ("PCF") 1125, Application Function ("AF") 1130, UPF 1105, SGW 1117, UDM 1140, HSS 1142, Authentication Server Function ("AUSF") 1145, AS 305, and Data Network ("DN") 1150.

Portions of environment 1100 may correspond to a LTE EPS network, such as LTE RAN 1112, eNB 103, MME 201, SGW 1117, and HSS 1142. Portions of environment 1100 may correspond to a 5G core network, such as AMF 203, NEF 303, SMF 1103, UPF 1105, PCF 1125, AF 1130, UDM 1140, and AUSF 1145. While not explicitly shown in FIG.

11, environment 1100 may include additional, fewer, different, or differently arranged elements the LTE EPS and/or of the 5G core network. Further, in some embodiments, environment 1100 may include a 5G RAN (e.g., as implemented by one or more gNBs) and/or a RAN that implements another type of RAT (e.g., a Third Generation ("3G") RAT, and/or some other RAT). For the sake of brevity, only some portions of the LTE EPS network and the 5G core network are described here.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. Alternatively, or additionally, one or more of the devices of environment 1100 may perform one or more functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100.

LTE UE 107 may include a computation and communication device, such as a wireless mobile communication device that is capable of communicating with LTE RAN 1112, DN 1150, and/or AS 305. LTE UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. As provided for herein, LTE UE 107 may send traffic to and/or receive traffic (e.g., user plane traffic) from AS 305 via DN 1150, SGW 1117, RAN 1112, and/or UPF 1105.

While described herein in the context of LTE UE 107 being an "LTE UE," in practice, LTE UE 107 may be a "dual mode" or "multi mode" UE that is capable of communicating via a 5G RAT and/or some other type of RAT. For example, if LTE UE 107 is capable of communicating via an LTE RAT and a 5G RAT, LTE UE 107 may communicate using a 5G RAT when in communication range of a 5G RAN (e.g., as implemented by a gNB), and may communicate using an LTE RAT when in communication range of a LTE RAN.

LTE RAN 1112 may be, or may include, an LTE RAN that includes one or more base stations (e.g., one or more eNBs 103), via which LTE UE 107 may communicate with one or more other elements of environment 1100. LTE UE 107 may communicate with LTE RAN 1112 via an air interface (e.g., as provided by eNB 103). For instance, RAN 1110 may receive traffic (e.g., voice call traffic, data traffic, messaging traffic, signaling traffic, etc.) from LTE UE 107 via the air interface, and may communicate the traffic to UPF 1105, and/or one or more other devices or networks. Similarly, RAN 1110 may receive traffic intended for LTE UE 107 (e.g., from UPF 1105, SGW 1117, and/or one or more other devices or networks) and may communicate the traffic to LTE UE 107 via the air interface.

AMF 203 may include one or more devices, systems, Virtualized Network Functions ("VNFs"), etc., that perform operations to register LTE UE 107 with the 5G network, to establish bearer channels associated with a PDU session with LTE UE 107, to hand off LTE UE 107 from the 5G network to another network, to hand off LTE UE 107 from the other network to the 5G network, and/or to perform other operations. In some embodiments, the 5G network may include multiple AMFs 203, which communicate with each other via the N14 interface (denoted in FIG. 11 by the line marked "N14" originating and terminating at AMF 203).

MME 201 may include one or more devices, systems, VNFs, etc., that perform operations to register LTE UE 107, to facilitate the establishment of bearer channels associated with LTE UE 107, to facilitate handovers of LTE UE 107, and/or to perform other operations. MME 201 may communicate with AMF 203 via an N26 interface. MME 201 may, in some embodiments, be implemented by the same device or system that implements LTE-5G IWF 105, and/or may be communicatively coupled with LTE-5G IWF 105. For example, MME 201 may communicate with LTE-5G IWF 105 via an N26 interface, and/or may instruct LTE-5G IWF 105 to communicate with AMF 203 via an N26 interface.

LTE-5G IWF 105 may include one or more devices, systems, VNFs, etc., that perform operations described herein. Generally speaking, for example, LTE-5G IWF 105 facilitate the establishment or modification of user plane communications between LTE UE 107 and UPF 1105, by communicating with elements of the LTE EPS network (e.g., MME 201) and elements of the 5G core network (e.g., AMF 203). LTE-5G IWF 105 may, for example, map 5G parameters or messages to LTE parameters or messages to facilitate the establishment or modification of such communications.

SGW 1117 may include one or more devices, systems, VNFs, etc., that aggregate traffic received from one or more eNBs 103 and send the aggregated traffic to an external network or device via UPF 1105. Additionally, SGW 1117 may aggregate traffic received from one or more UPFs 1105 and may send the aggregated traffic to one or more eNBs 103. SGW 1117 may operate as an anchor for the user plane during inter-eNB handovers and as an anchor for mobility between different telecommunication networks or LTE RANs 1112.

SMF 1103 may include one or more devices, systems, VNFs, etc., that gather, process, store, and/or provide information in a manner described herein. SMF 1103 may, for example, facilitate in the establishment of communication sessions on behalf of LTE UE 107. In some embodiments, the establishment of communications sessions may be performed in accordance with one or more policies provided by PCF 1125.

PCF 1125 may include one or more devices, systems, VNFs, etc., that aggregate information to and from the 5G network and/or other sources. PCF 1125 may receive information regarding policies and/or subscriptions from one or more sources, such as subscriber databases and/or from one or more users (such as, for example, an administrator associated with PCF 1125).

AF 1130 may include one or more devices, systems, VNFs, etc., that receive, store, and/or provide information that may be used in determining parameters (e.g., quality of service parameters, charging parameters, or the like) for certain applications.

UPF 1105 may include one or more devices, systems, VNFs, etc., that receive, store, and/or provide data (e.g., user plane data). For example, UPF 1105 may receive user plane data (e.g., voice call traffic, data traffic, etc.), destined for LTE UE 107, from DN 1150, and may forward the user plane data toward LTE UE 107 (e.g., via LTE RAN 1112, SGW 1117, and/or one or more other devices). In some embodiments, multiple UPFs 1105 may be deployed (e.g., in different geographical locations and/or for different traffic or service types), and the delivery of content to LTE UE 107 may be coordinated via the N9 interface (e.g., as denoted in FIG. 11 by the line marked "N9" originating and terminating at UPF 1105). Similarly, UPF 1105 may receive traffic from LTE UE 107 (e.g., via RAN 1112, SGW 1117, and/or one or more other devices), and may forward the traffic toward DN 1150. In some embodiments, UPF 1105 may communicate (e.g., via the N4 interface) with SMF 1103, regarding user plane data processed by UPF 1105.

UDM 1140, HSS 1142, and AUSF 1145 may include one or more devices, systems, VNFs, etc., that manage, update, and/or store profile information associated with one or more subscribers. UDM 1140, HSS 1142, and/or AUSF 1145 may perform authentication, authorization, and/or accounting operations associated with the subscriber and/or a communication session with LTE UE 107. One or more of these devices or systems may maintain information indicating particular Quality of Service ("QoS") levels that are associated with particular subscribers. In some embodiments, the QoS information may also be maintained on a per-traffic type basis, a per-device type basis, and/or some other basis. In this manner, UDM 1140, HSS 1142, and/or AUSF 1145 may be involved in processes where a QoS level for a given UE, subscriber, traffic flow, etc. is to be determined or verified.

NEF 303 may include one or more devices, systems, VNFs, etc., that provide an interface between devices external to the 5G core network and devices that are associated with the 5G core network. For example, as described herein, NEF 303 may receive location information associated with eNB 103, and may provide the location information to authorized devices or systems, such as AS 305.

AS 305 may include one or more devices and/or systems that may provide services and/or that may otherwise communicate with LTE UE 107 via DN 1150. As discussed above, AS 305 may communicate with NEF 303 to obtain information associated with LTE UE 107, such as a location associated with LTE UE 107 (e.g., which may be based on a location of eNB 103, to which LTE UE 107 is connected).

DN 1150 may include one or more wired and/or wireless networks. For example, DN 1150 may include an IP-based PDN, a wide area network ("WAN") such as the Internet, a private enterprise network, and/or one or more other networks. LTE UE 107 may communicate, through DN 1150, with data servers, other UEs, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which LTE UE 107 may communicate.

Figure 12:
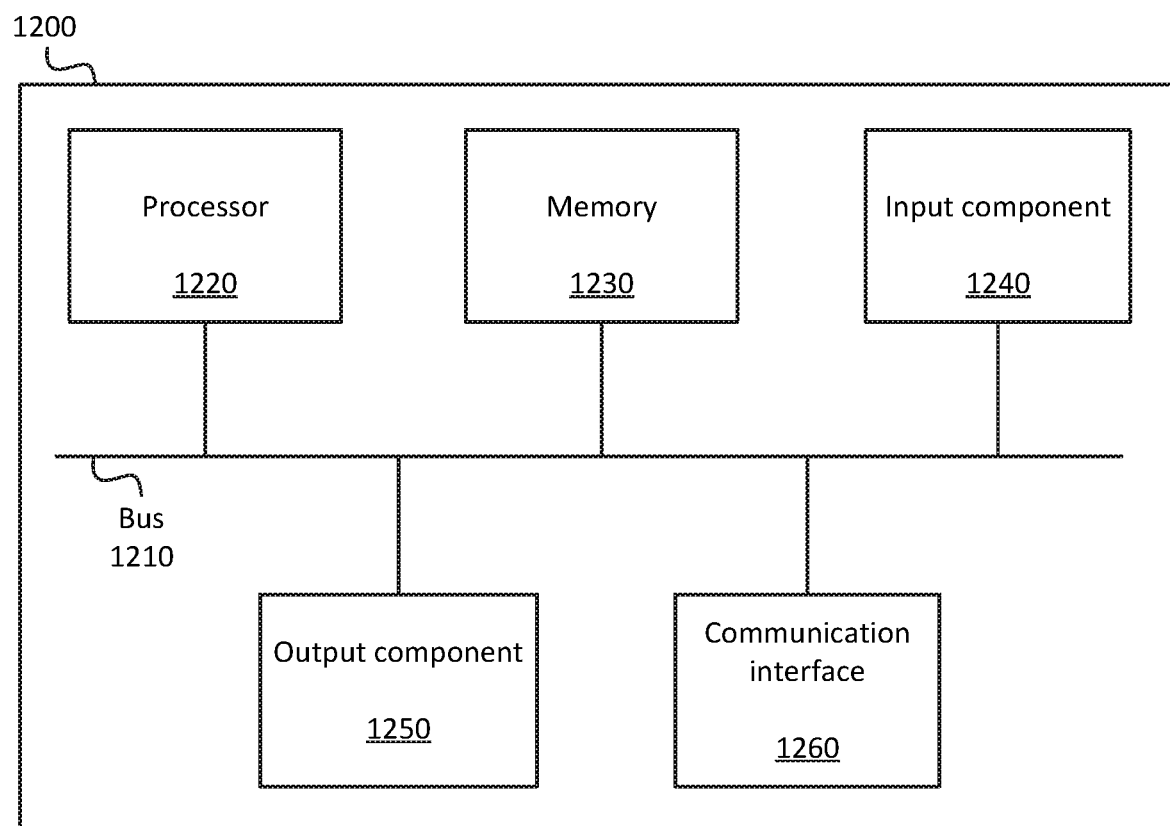
FIG. 12 illustrates example functional components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 3A, 3B, and 4-10), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive, from a first network device associated with a Long-Term Evolution ("LTE") radio access network ("RAN"), a first message that includes first location information for an evolved Node B ("eNB") to which a User Equipment ("UE") is communicatively coupled;
generate, based on receiving the first message, second location information associated with a virtual Next Generation Node B ("vgNB"), the second location information being associated with the first location information indicated in the first message;
establish a user plane communication session between a Fifth Generation ("5G") core network and the UE, via the LTE RAN, based on receiving the first message; and
provide the second location information to a particular device associated with the 5G core network, wherein the 5G core network utilizes the second location information for location-based services associated with the UE.

2. The device of claim 1, wherein the particular device associated with the 5G core network includes a Network Exposure Function ("NEF"), wherein the NEF provides the second location information to a requesting device that requests the location of the UE.

3. The device of claim 1, wherein the first message is based on an Attach Request provided by the eNB to which the UE is communicatively coupled.

4. The device of claim 3, wherein the first message is received from a Mobility and Management Entity ("MME") that is communicatively coupled to the eNB.

5. The device of claim 1, wherein the eNB is a first eNB and wherein the vgNB is a first vgNB, wherein the one or more processors are further configured to:
receive an indication of a handover of the UE from the first eNB to a second eNB, the indication including third location information associated with the second eNB; and
generate, based on receiving the indication, information associated with a second vgNB, wherein generating the information for the second vgNB includes generating fourth location information for the second vgNB, the fourth location information being associated with the third location information included in the indication of the handover.

6. The device of claim 5, wherein the indication of the handover is based on a Path Switch Request provided by the second eNB.

7. The device of claim 5, wherein the indication of the handover is based on a Forward Relocation Request provided by a Mobility and Management Entity ("MME") that is communicatively coupled to the second eNB.

8. A non-transitory computer-readable medium, storing a plurality of processor-executable instructions to:
receive, from a first network device associated with a Long-Term Evolution ("LTE") radio access network ("RAN"), a first message that includes first location information for an evolved Node B ("eNB") to which a User Equipment ("UE") is communicatively coupled;
generate, based on receiving the first message, second location information associated with a virtual Next Generation Node B ("vgNB"), the second location information being associated with the first location information indicated in the first message;
establish a user plane communication session between a Fifth Generation ("5G") core network and the UE, via the LTE RAN, based on receiving the first message; and
provide the second location information to a particular device associated with the 5G core network, wherein the 5G core network utilizes the second location information for location-based services associated with the UE.

9. The non-transitory computer-readable medium of claim 8, wherein the particular device associated with the 5G core network includes a Network Exposure Function ("NEF"), wherein the NEF provides the second location information to a requesting device that requests the location of the UE.

10. The non-transitory computer-readable medium of claim 8, wherein the first message is based on an Attach Request provided by the eNB to which the UE is communicatively coupled.

11. The non-transitory computer-readable medium of claim 10, wherein the first message is received from a Mobility and Management Entity ("MME") that is communicatively coupled to the eNB.

12. The non-transitory computer-readable medium of claim 8, wherein the eNB is a first eNB and wherein the vgNB is a first vgNB, wherein the processor-executable instructions further include processor-executable instructions to:
 receive an indication of a handover of the UE from the first eNB to a second eNB, the indication including third location information associated with the second eNB; and
 generate, based on receiving the indication, information associated with a second vgNB, wherein generating the information for the second vgNB includes generating fourth location information for the second vgNB, the fourth location information being associated with the third location information included in the indication of the handover.

13. The non-transitory computer-readable medium of claim 12, wherein the indication of the handover is based on a Path Switch Request provided by the second eNB.

14. The non-transitory computer-readable medium of claim 12, wherein the indication of the handover is based on a Forward Relocation Request provided by a Mobility and Management Entity ("MME") that is communicatively coupled to the second eNB.

15. A method, comprising:
 receiving, from a first network device associated with a Long-Term Evolution ("LTE") radio access network ("RAN"), a first message that includes first location information for an evolved Node B ("eNB") to which a User Equipment ("UE") is communicatively coupled;
 generating, based on receiving the first message, second location information associated with a virtual Next Generation Node B ("vgNB"), the second location information being associated with the first location information indicated in the first message;
 establishing a user plane communication session between a Fifth Generation ("5G") core network and the UE, via the LTE RAN, based on receiving the first message; and
 providing the second location information to a particular device associated with the 5G core network, wherein the 5G core network utilizes the second location information for location-based services associated with the UE.

16. The method of claim 15, wherein the particular device associated with the 5G core network includes a Network Exposure Function ("NEF"), wherein the NEF provides the second location information to a requesting device that requests the location of the UE.

17. The method of claim 15, wherein the first message is based on an Attach Request provided by the eNB to which the UE is communicatively coupled, wherein the first message is received from a Mobility and Management Entity ("MME") that is communicatively coupled to the eNB.

18. The method of claim 15, wherein the eNB is a first eNB and wherein the vgNB is a first vgNB, the method further comprising:
 receiving an indication of a handover of the UE from the first eNB to a second eNB, the indication including third location information associated with the second eNB; and
 generating, based on receiving the indication, information associated with a second vgNB, wherein generating the information for the second vgNB includes generating fourth location information for the second vgNB, the fourth location information being associated with the third location information included in the indication of the handover.

19. The method of claim 18, wherein the indication of the handover is based on a Path Switch Request provided by the second eNB.

20. The method of claim 18, wherein the indication of the handover is based on a Forward Relocation Request provided by a Mobility and Management Entity ("MME") that is communicatively coupled to the second eNB.

* * * * *